United States Patent [19]

Moran

[11] 4,370,743
[45] Jan. 25, 1983

[54] TIME DIVISION SWITCHING SYSTEM
[75] Inventor: John C. Moran, Glen Ellyn, Ill.
[73] Assignee: Bell Telephone Laboratories, Incorporated, Murray Hill, N.J.
[21] Appl. No.: 172,191
[22] Filed: Jul. 25, 1980
[51] Int. Cl.³ .......................................... H04Q 11/04
[52] U.S. Cl. ........................................ 370/67; 370/60
[58] Field of Search ................... 370/67, 66, 68, 62, 370/85, 60

[56] References Cited

U.S. PATENT DOCUMENTS

| | | | |
|---|---|---|---|
| 3,637,941 | 1/1972 | Rekiere | 370/68 |
| 3,769,461 | 10/1973 | Lewis | 370/67 |
| 3,996,566 | 12/1976 | Moran | 364/200 |
| 4,061,880 | 12/1977 | Collins et al. | 370/62 |
| 4,069,399 | 1/1978 | Barrett et al. | 370/62 |

OTHER PUBLICATIONS

"The GTD-1000 Digital PABX", by Wegner, *GTE Automatic Electric Journal*, Mar., 1977, pp. 262-268.
"New Digital Electronic PABX Family" by Garavalia, *GTE Automatic Electric Journal*, May, 1977, pp. 303-311.
"GTD-4600 Network Description", by Jacob et al., *GTE Automatic Electric Journal*; Mar., 1978, pp. 57-65.

*Primary Examiner*—Douglas W. Olms
*Attorney, Agent, or Firm*—D. M. Duft

[57] ABSTRACT

A multimodule time division switching system is disclosed in which intermodule calls are served by transmitting call information words over a bus system interconnecting all modules. Each transmitted word contains information specifying the receiving module identification number, the time slot in which the call is to be served in the receiving module, as well as the message or intelligence representing the subject matter of the call. A FIFO memory in each module is used as an input buffer to temporarily store each received word and thereby reduce the need for short term time slot synchronization between modules.

17 Claims, 16 Drawing Figures

WORD FORMAT FOR DATA RECEIVED FROM CC

PCM INTERMODULE WORD

FIFO 204

STATUS RAM 321

PROM 255

FIG. 14

| TRANS-MITTING MODULE | RECEIVING MODULE | RECEIVING MODULE ID | RECEIVING MODULE TIME SLOT | TRANS-MITTED TIME SLOT |
|---|---|---|---|---|
| 1 | 0 | 133 | 5 | 23 |
| 11 | 0 | 12 | 5 | 5 |
| 0 | 1 | 33 | 10 | 10 |
| 11 | 1 | 12 | 10 | 5 |
| 1 | 11 | 133 | 23 | 23 |
| 0 | 11 | 33 | 23 | 10 |

FIG. 15 a

| MODULE ID XMITTED | RECEIVING MODULES | |
|---|---|---|
| | NORM MODE | CONF MODE |
| 0 | 0 | NONE |
| 1 | 1 | |
| 2 | 2 | |
| 3 | 3 | |
| 4 | 4 | |
| 5 | 5 | |
| 6 | 6 | |
| 7 | 7 | |
| 8 | 8 | |
| 9 | 9 | |
| 10 | 10 | |
| 11 | 11 | | b

| MODULE ID XMITTED | RECEIVING MODULES | |
|---|---|---|
| | NORM MODE | CONF MODE |
| 12 | 0 | 1 |
| 13 | | 2 |
| 14 | | 3 |
| 15 | | 4 |
| 16 | | 5 |
| 17 | | 6 |
| 18 | | 7 |
| 19 | | 8 |
| 20 | | 9 |
| 21 | | 10 |
| 22 | | 11 |
| 23 | 1 | 0 |
| 24 | | 2 |
| 25 | | 3 |
| 26 | | 4 |
| 27 | | 5 |
| 28 | | 6 |
| 29 | | 7 |
| 30 | | 8 |
| 31 | | 9 |
| 32 | | 10 |
| 33 | | 11 |
| 34 | 2 | 0 |
| 35 | | 1 |
| 36 | | 3 |
| 37 | | 4 |
| 38 | | 5 |
| 39 | | 6 |
| 40 | | 7 |
| 41 | | 8 |
| 42 | | 9 |
| 43 | | 10 |
| 44 | | 11 |
| 45 | 3 | 0 |
| 46 | | 1 |
| 47 | | 2 |
| 48 | | 4 |
| 49 | | 5 |
| 50 | | 6 |
| 51 | | 7 |
| 52 | | 8 |
| 53 | | 9 |
| 54 | | 10 |
| 55 | | 11 | c

| MODULE ID XMITTED | RECEIVING MODULES | |
|---|---|---|
| | NORM MODE | CONF MODE |
| 56 | 4 | 0 |
| 57 | | 1 |
| 58 | | 2 |
| 59 | | 3 |
| 60 | | 5 |
| 61 | | 6 |
| 62 | | 7 |
| 63 | | 8 |
| 64 | | 9 |
| 65 | | 10 |
| 66 | | 11 |
| 67 | 5 | 0 |
| 68 | | 1 |
| 69 | | 2 |
| 70 | | 3 |
| 71 | | 4 |
| 72 | | 6 |
| 73 | | 7 |
| 74 | | 8 |
| 75 | | 9 |
| 76 | | 10 |
| 77 | | 11 |
| 78 | 6 | 0 |
| 79 | | 1 |
| 80 | | 2 |
| 81 | | 3 |
| 82 | | 4 |
| 83 | | 5 |
| 84 | | 7 |
| 85 | | 8 |
| 86 | | 9 |
| 87 | | 10 |
| 88 | | 11 |
| 89 | 7 | 0 |
| 90 | | 1 |
| 91 | | 2 |
| 92 | | 3 |
| 93 | | 4 |
| 94 | | 5 |
| 95 | | 6 |
| 96 | | 8 |
| 97 | | 9 |
| 98 | | 10 |
| 99 | | 11 | d

| MODULE ID XMITTED | RECEIVING MODULES | |
|---|---|---|
| | NORM MODE | CONF MODE |
| 100 | 8 | 0 |
| 101 | | 1 |
| 102 | | 2 |
| 103 | | 3 |
| 104 | | 4 |
| 105 | | 5 |
| 106 | | 6 |
| 107 | | 7 |
| 108 | | 9 |
| 109 | | 10 |
| 110 | | 11 |
| 111 | 9 | 0 |
| 112 | | 1 |
| 113 | | 2 |
| 114 | | 3 |
| 115 | | 4 |
| 116 | | 5 |
| 117 | | 6 |
| 118 | | 7 |
| 119 | | 8 |
| 120 | | 10 |
| 121 | | 11 |
| 122 | 10 | 0 |
| 123 | | 1 |
| 124 | | 2 |
| 125 | | 3 |
| 126 | | 4 |
| 127 | | 5 |
| 128 | | 6 |
| 129 | | 7 |
| 130 | | 8 |
| 131 | | 9 |
| 132 | | 11 |
| 133 | 11 | 0 |
| 134 | | 1 |
| 135 | | 2 |
| 136 | | 3 |
| 137 | | 4 |
| 138 | | 5 |
| 139 | | 6 |
| 140 | | 7 |
| 141 | | 8 |
| 142 | | 9 |
| 143 | | 10 |

TIME DIVISION SWITCHING SYSTEM

TECHNICAL FIELD

This invention relates to a switching system and, in particular, to a time division switching system having a plurality of call serving switching modules. The invention further relates to plural module time division switching system in which intermodule calls are served by transmitting call information over a bus system that interconnects all modules. The invention still further relates to a time division switching system in which the transmitted intermodule call information comprises a series of information words for each call with each word containing information specifying the identity of the module of which the word is directed, the time slot in which the receiving module is to serve the call, as well as call message information representing the speech, data, or other intelligence that is to be exchanged between the calling and called stations.

CROSS REFERENCE TO RELATED APPLICATIONS

This application is related to a co-pending and concurrently filed application by the same inventor filed July 25, 1980, Ser. No. 172,273 which is directed to a plural module time division switching system having facilities for serving intermodule conference calls.

BACKGROUND OF THE INVENTION

Various technologies have been used in time division switching systems as interconnection facilities so that the system port circuits can communicate with one another during the serving of calls. These facilities increase in complexity as the size of the system increases. The J. C. Moran U.S. Pat. No. 3,996,566, issued Dec. 7, 1976, discloses a switching system having a single PAM type time division bus connected to all of the system port circuits. Two port circuits are interconnected on a call by assigning them to the same time slot and by activating circuitry within the two port circuits which permits them to exchange speech samples over the bus during each occurrence of the assigned time slot.

Single bus systems as shown by Moran are suitable only for use in small to medium size installations since the system's call serving capacity is limited by a number of factors including the number of system time slots. For example, in a 64-time slot PAM system, no more than 64 simultaneous calls can be served—regardless of the number of lines and/or trunk port circuits provided. The system's call serving capability cannot easily be increased by merely increasing the number of time slots since this presents other problems—such as increased costs of the port circuit sampling circuitry. Thus, there are limits imposed by economical and technical considerations regarding the number of simultaneous calls that can be served by single bus systems of the type shown by Moran.

Increased call serving capacity has been provided in prior art time division switching systems by the use of switching facilities of greater complexity. One such prior art arrangement, which is useful for medium size systems, is shown in the article entitled "The GTD-100 Digital PBX" in the AUTOMATIC ELECTRIC JOURNAL of March 1977, pages 262 through 268. The system shown on FIG. 6 of this article comprises a plurality of groups of port circuits with each group being sampled at a 24-time slot rate. The samples from the various port circuit groups are combined by multiplexing them first up to a 96-time slot signal and then up to a 192-time slot signal. The call switching and time slot interchange functions are performed at the 192-time slot stage. This upward multiplexing permits the system to provide a greater call serving capacity than the Moran system; however, it does so at the price of increased cost and complexity.

Further increases in call serving capacity have been provided by arrangements of still further complexity, such as by the use of networks of the time-space-time type. This is shown on FIG. 5 of the article entitled "New Digital Electronic PABX Family", pages 303 through 311 of the AUTOMATIC ELECTRIC JOURNAL of May 1977. This figure shows a system having a time-space-time network in which a group of port circuits is sampled at a 24-time slot rate. The signals from the various groups are combined by multiplexing them up to a 96-time slot signal and then up to a 384-time slot signal which is applied to a time slot driven space division switch. This switch selectively interconnects the various 384-time slot signal paths to perform its call serving functions. The network shown in FIG. 5 of this article is shown in further detail in FIG. 1 of the article entitled "GTD-4600 Network Description" on pages 57 through 65 of the AUTOMATIC ELECTRIC JOURNAL of March 1978.

It is also known to use plural module systems in order to provide increased call serving capability. However, system timing and synchronization facilities present a particular problem in plural module time division switching systems. Great precision is required of these facilities in the serving of intermodule calls so that each call signal is sampled at the correct time in a first module, processed by the circuitry of the first module, transmitted to a second module, processed by the circuitry of the second module, and applied to the time division bus of the second module during the correct time slot.

System timing and synchronization is critical for these operations since, for quality call service, it is necessary that each call sample be applied with timewise precision to the various circuits and circuit elements involved in the processing and transmission of the sample. The call samples are not normally held in storage and are essentially in transit from the time they are generated at a first station until they are applied to and received at a second station. If the timing and synchronization circuitry does not operate with the required precision, degraded call service in the form of distortion, crosstalk, etc. will result.

Prior art plural module time division switching systems utilize arrangements in which each module has its own oscillator as well as arrangements in which the entire system has a single master oscillator that drives a clock within each module. Both of these arrangements involve the use of complex circuitry. Systems having an oscillator in each module require a master system timing source for keeping all module oscillators precisely on frequency. Systems that have only a single master oscillator require expedients such as delay lines, cables cut to the precise length, etc. in order to achieve precision frequency and time slot coordination between modules.

In summary, although prior art arrangements are known which enable plural module time division switching systems to serve whatever reasonable level of traffic may be desired, this is done at the expense of increased cost and system complexity such as the use of time-space-time networks, upward multiplexing facilities, and complex timing and network synchronization facilities.

SUMMARY OF THE INVENTION

The foregoing problem is solved and a technical advance is achieved by an arrangement which provides a time division switching system of increased call serving capacity that does not require complex and costly switching or timing facilities. The present invention comprises a stored program controlled time division switching system having a plurality of call serving switching modules, a time division bus within each module, a plurality of port circuits connected to the bus of each module and an intermodule bus system that is used for serving intermodule calls.

The present system serves intramodule calls in the same manner as shown by Moran, namely by assigning the two port circuits to be interconnected to the same time slot and by applying PAM speech samples for each of the two port circuits onto the time division bus of the module during each occurrence of the assigned time slot. Intermodule calls are served by transmitting call information of data words over the intermodule bus system between the two modules involved on a call. Each word contains a number of fields of information including an identification (ID number) of the module that is to receive and respond to the word, the time slot in which the call is to be served within the receiving module, and call message information in PCM form representing the speech, data, or other intelligence comprising the subject matter of the call.

The intermodule bus system includes a plurality of individual paths each of which extends from an output on one of the modules to a unique input on each of the other modules. In other words, each module has a single output which is connected via a unique bus path to an input on all the other modules; each module also has a plurality of inputs each of which is connected by a unique bus path to corresponding inputs of other modules as well as to an output of a different one of the other modules.

Each call information word that is applied by a transmitting module to the bus system is received by an input on each of the other modules. However, on two party calls, the only module that responds is the one that is specified by the module ID number contained in transmitted word.

The circuitry of each input of each module includes a first in/first out memory (FIFO) unique to the input. The module that detects the presence of its module ID number in a received word, unlocks the receiving circuitry of the input on which the word is received and enters the remaining fields of the word (the call message plus the time slot fields) into the FIFO unique to this input. Each FIFO acts as a buffer and temporarily stores the call message and time slot fields of each word received by its input. The plurality of FIFOs within a module, together, receive and temporarily store the call message time slot fields of the call information or data words transmitted to the module over the bus system and pertaining to intermodule calls currently being served by the module.

Each module contains circuitry which cyclically scans its FIFOs one at a time, reads out each FIFO currently storing call information, and writes the read out information into a time slot driven memory (RAM). The time slot number in the read out information is used as RAM address information for this write operation and the information that is written into the RAM comprises the call message information representing the subject matter of the call. The call message information in the RAM is subsequently read out, decoded from PCM to PAM, applied to the module's PAM bus during the required time slot, and extended over the bus to the port circuit of the station involved on the call.

The provision of the FIFOs in the input circuitry of a module provides short term buffering facilities which enable a module to receive and temporarily store all of the call words transmitted to it from other modules and, at the same time, eliminates the need for precise short term time slot synchronization between modules. Long term time slot synchronization is still required so no call information is lost. Thus, the complex circuitry used in the prior art arrangements for short time slot synchronization is not required. Also, the use of the bus system to transmit call information between modules eliminates the need for complex upward multiplexing and switching facilities of prior art arrangements and, at the same time, provides a multimodule system having adequate call serving capacity.

BRIEF DESCRIPTION OF THE DRAWING

FIG. 14 discloses time slot and other information pertaining to a hypothetical call described in the present specification.

FIG. 15 discloses the module identification numbers that may be contained in the information words transmitted between modules for different types of calls.

FIG. 16 portrays the manner in which FIGS. 2 and 3 should be arranged with respect to each other.

GENERAL DESCRIPTION—FIG. 1

Figure 1:
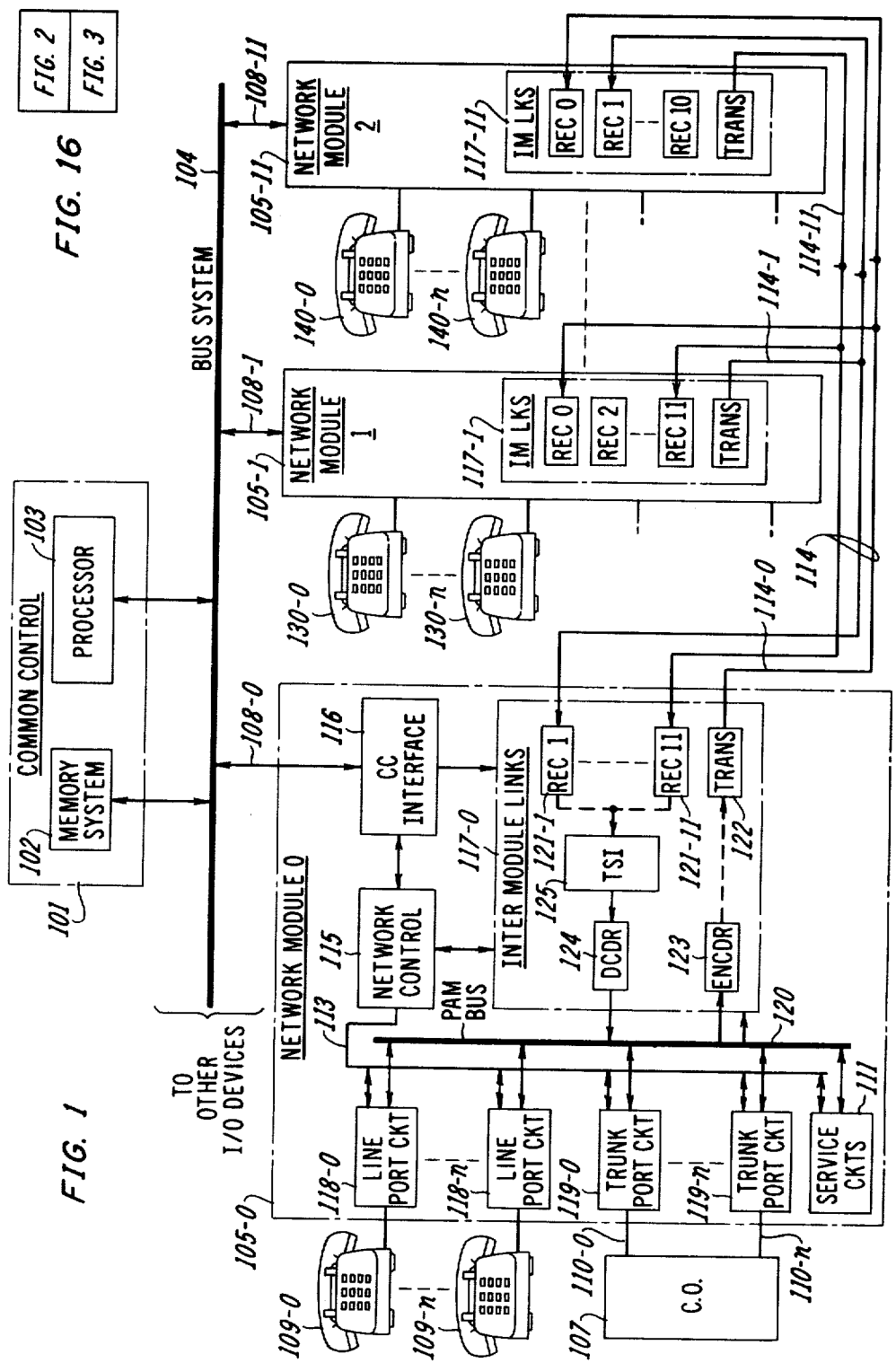
FIG. 1 discloses a system embodying the present invention in block schematic form.

A telephone time division switching system embodying the invention is shown diagrammatically on FIG. 1. This system is of the stored program controlled type and comprises a common control 101, a control bus system 104, a plurality of network modules 105, and a bus system 114 interconnecting the network modules. Common control 101 includes memory system 102 and processor 103. Each network module 105 includes a time division bus 120 to which is connected a plurality of port circuits 118 and 119. The line port circuits 118 are connected to telephones 109; the trunk port circuits 119 are connected over trunks 110 to central office 107. Each network module 105 further includes a CC interface 116, intermodule links 117, and network control 115 which is connected over path 113 to the port circuits. Each module 105 further includes service circuits 111 which are a source for all the service tones and ringing signals required by the system.

The control bus system 104 includes data buses, address buses, and memory control buses as required for control of the system by the processor 103 and memory 102. The control bus system 104 is connected over paths 108 to each of the modules 105 to control their call serving functions.

Each port circuit 118 and 119 includes control circuitry, speech circuitry, and time division sampling facilities which are used to interconnect the speech circuitry of the port circuit with time division bus 120 during each occurrence of a specified time slot. Bus 120 and the port circuits provide the communication paths over which the telephones 109 or trunks 110 may communicate with one another during the serving of calls.

Processor 103 operates under the control of program commands and data that is either temporarily or permanently stored in memory 102. The processor controls the sampling switches within the port circuits as well as the rest of the circuitry within each network module. It does this by monitoring the state of each circuit and by selectively altering the state of the various elements within network control 115 and CC interface 116. Commands are transmitted via the CC interface 116 to network control 115 from the processor over bus systems 104 and 108. Scan responses and other state information from the network modules are detected by facilities within network control 115 and are transmitted back to common control over the same bus systems.

Two line port circuits 118 or a line port circuit 118 and a trunk port circuit 119 are interconnected on an intramodule call by determining the availability of an idle time slot upon the detection of a service request by one of the port circuits, by assigning the two port circuits that are to be connected to the idle time slot and by then closing the time division switches within the two port circuits during each occurrence of the assigned time slot. In a typical prior art manner, each port circuit contains a shift register and a port circuit is assigned to a specific time slot by writing a binary 1 in a shift register position unique to the assigned time slot. The advancement of the shift register once per time slot causes the port circuit's time division switch to close during each occurrence of the assigned time slot as a binary 1 is read out of its shift register. A port circuit is removed from a call by erasing the binary 1 in its shift register. This deactivates the port ciruit's time division switch so that it does not thereafter close during subsequent occurrences of the time slot to which it was assigned.

Processor 103 can selectively address memory 102 locations by transmitting address information over the bus system 104 to the memory. The contents of the addressed memory location are returned to the processor over the bus system. The processor communicates with the CC interface 116 and network control 115 in a similar manner with address commands being transmitted over the bus system to specify the system function to be performed. An I/O signal is concurrently transmitted with each address command over the bus system to specify the particular circuit that is to respond to the address command. The system's responses are returned to the processor over the bus system. The bus system 104 may include a plurality of separate conductors with each conductor being used for a distinct circuit function such as, for example, a memory write, memory read, and memory complete indication.

The following describes the operation of the system of FIG. 1 in the serving of an intramodule call. Assume that telephone 109-0 connected to line port circuit 118-0 is to be interconnected on a call with telephone 109-n connected to line port circuit 118-n. The program operating in common control establishes this connection using elements 115 and 116 to close the time division switches within these two port circuits during the same time slot. The establishment of this connection is described by Moran and is effected in the conventional manner by the steps of (1) detecting the off-hook state of calling circuit 118-0, (2) applying dial tone to circuit 118-0 using service circuits 111 as a tone source, (3) detecting the digits dialed by subscriber 109-0, (4) assigning an idle time slot to the call, (5) writing a 1 in the proper bit position of the shift register within each of port circuits 118-0 and 118-n to close their time division switches during each occurrence of the assigned time slot, (7) applying ringing current to the called station 109-n, and (8) monitoring the off-hook condition of each station following the establishment of the connection. A connection between a calling line and a trunk circuit 119 is made in essentially the same manner.

Once established, the call is monitored for its duration and then, upon the detection of an on-hook condition of either party, the two port circuits are disconnected signalwise by deactivating their line switches so that they no longer close during subsequent occurrences of the time slot to which they were assigned.

Intermodule calls are served using the intermodule links 117 of each module as well as the intermodule bus system 114. Each module, such as module 105-0, has a single output (TRANS) and a plurality of inputs (REC 1 through 11). The TRANS output of each module is connected to an individual conductor of the bus system 114 and this conductor, in turn, is connected to a REC input on each of the other modules. The plurality of REC inputs of a module are connected to separate conductors of the bus system 114 with each such conductor being connected to the TRANS output of a different one of the other modules. For example, the TRANS output of module 105-0 is connected to path 114-0 which, in turn, is connected to the REC 0 input on each of the other network modules 105. Similarly, inputs 1 through 11 of module 105-0 are connected via conductors 114-1 through 114-11 to the TRANS output of each of modules 114-1 through 114-11, respectively.

Links 117-0 are connected to PAM bus 120 of module 105-0 by decoder 124 and encoder 123. These elements include the same type of sampling switches as contained in port circuits 118 and 119. The sampling switches of elements 123 and 124 are closed during each occurrence of each time slot currently serving an intermodule call involving module 0. By this means, intermodule links 117-0 receive the PAM signals pertaining to intermodule calls on bus 120, they convert this information to PCM, and transmit the information to other network modules serving intermodule calls involving module 105-0. This PCM information is transmitted as subsequently described over path 114-0. Links 117 also receive call information from other modules, decode it and apply it to bus 120.

On a call between modules 0 and 1 for example, links 117-0 receive call information from PAM bus 120 during the time slot in which module 0 serves the call, encoder 123 converts the PAM information to PCM form, and transmitter 122 transmits the PCM, as well as other call information, to module 1 over path 114-0.

Module 1 receives the information on path 114-0 at its input REC 0, its element 125 performs a time slot interchange function, and its decoder 124 decodes the message portion of the received information from PCM to PAM form and applies it to its time division bus 120 during each occurrence of the time slot in which the call is to be served by module 1. Module 1 functions similarly in that it receives information from its time division bus 120, converts it to PCM, and transmits it over path 114-1 to input REC 1 of module 0.

Figure 10:
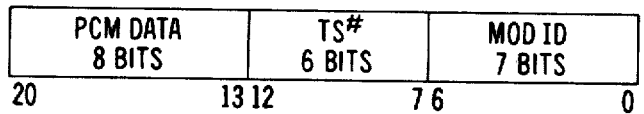

The information that is transmitted over bus 114 for the serving of intermodule calls is formed into data words having a 21-bit format as shown in FIG. 10. Bits 0 to 6 specify the module ID; bits 7 to 12 specify time slot information; bits 13 through 20 comprise the PCM data. The module ID information specifies the receiving module that is to respond to the transmitted word. This is necessary since the bus 114 to which the word is applied is connected in common to REC input circuitry on a plurality of modules. The time slot information specifies the time slot in which the call is to be served within the receiving module. The PCM data represents the call message information.

Let it be assumed that a call connection is to be made between phone 109-0 in module 0 and phone 130-0 in module 1. Further assume tht the call will be served by time slot 5 within module 0 and by time slot 10 in module 1. The determination of time slot availability and assignment for each module is done in a conventional prior art manner by common control 101.

Common control serves this call by detecting a service request by phone 109-0, assigning the call to time slot 5 in module 0, and by then activating the switch of port circuit 118-0 so it closes during each occurrence of time slot 5. After the caller has dialed the digits indicating an intermodule call, common control recognizes the call type and activates the time division switch of elements 123 and 124 of links 117-0 during each subsequent occurrence of time slot 5. Also, after common control determines that the called station 130-0 is served by module 1, it selects an idle time slot (time slot 10) within module 1, and then activates the switch of the port circuit for station 130-0 so that it closes during each occurrence of time slot 10 of module 1.

Encoder 123 receives the speech information of caller 109-0 on bus 120 during each occurrence of time slot 5 and converts the information from PAM to PCM. Common control causes links 117-0 to form a 21-bit word of the type shown on FIG. 10 during each occurrence of time slot 5 within module 0. The module ID for the receiving module is a 1 and the time slot in which the call is to be served within the receiving module is a 10. Therefore, as a result of each occurrence of time slot 5 within module 0, element 117-0 generates and applies to bus 114-0 a 21-bit word having a module ID of 1, a time slot number of 10, and the PCM information generated by encoder 123 as it sampled bus 120 during time slot 5. This information is applied by transmitter 122 to path 114-0 and is extened over path 114-0 to the input circuitry (REC 0) of module 1. From REC 0 of module 1, the call information is extended to phone 130-0.

In a manner similar to that for module 0, common control initializes network module 1 so that, as a result of each occurrence of its time slot 10, it transmits to module 0 a word of the type shown in FIG. 10. This word has a module ID of 0 for module 0, a time slot number 5 since module 0 is serving the call during its time slot 5, and the appropriate PCM data. This word is applied by the transmitter 122 of module 1 to path 114-1 and is received by module 0 at its input REC1. The PCM field of this received information is decoded, applied to bus 120 during each occurrence of time slot 5 and extended to station 109-0.

It should be noted that there is no requirement that a call be served by the same time slot within the two modules on an intermodule call. As a matter of fact, such a situation would be the exception rather than the rule. A single call can be served by two modules using different time slots because of the time slot interchange facilities of the disclosed system. It is also important to realize that at any given point in time, a particular module can serve any mixture of intramodule and intermodule calls up to the time slot capacity of the bus 120 within each module.

DETAILED DESCRIPTION—FIGS. 2 AND 3

Figure 2:
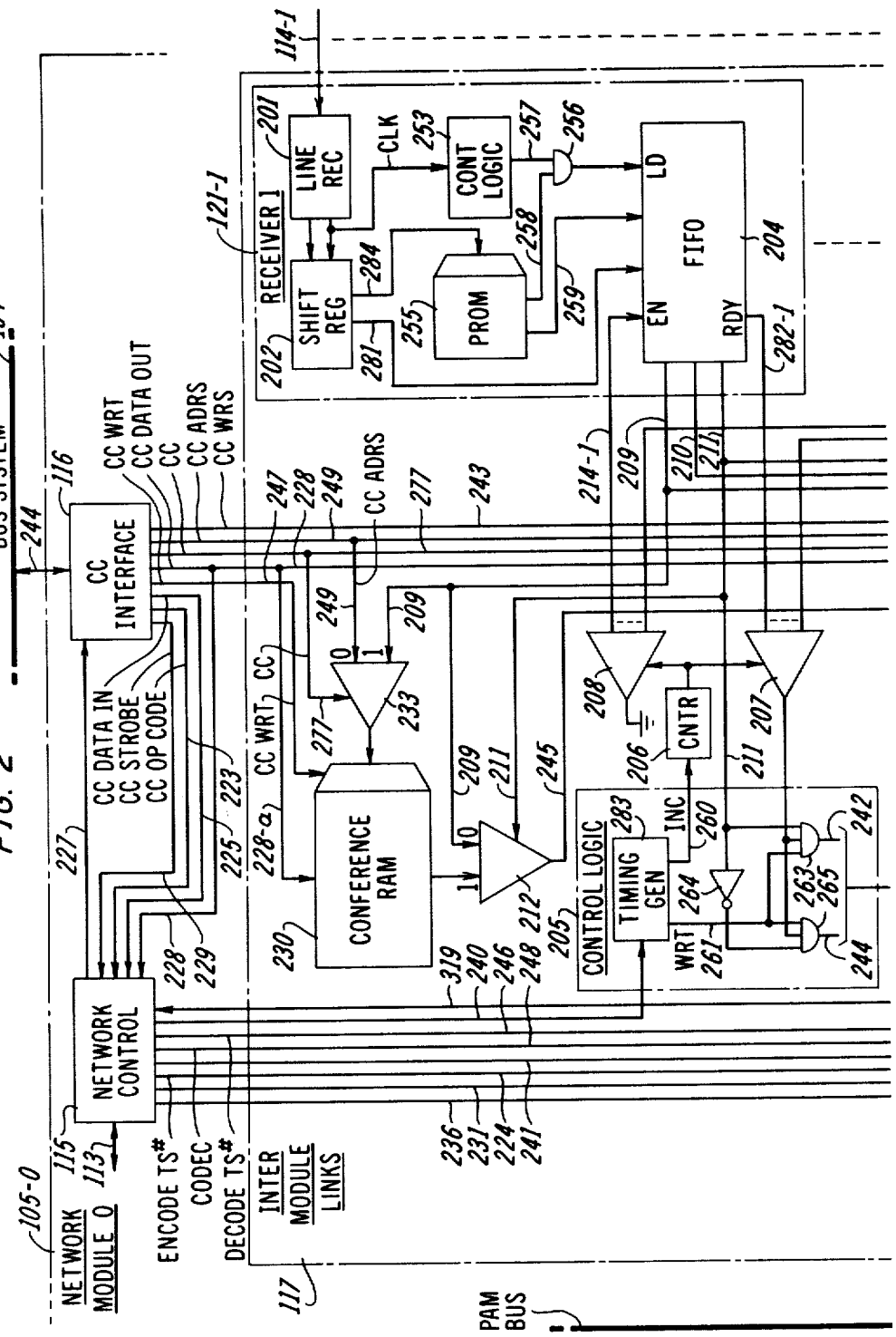
FIGS. 2 and 3, when arranged as shown on FIG. 16, discloses further details of the system of FIG. 1, and in particular, the intermodule links 117.
Figure 3:
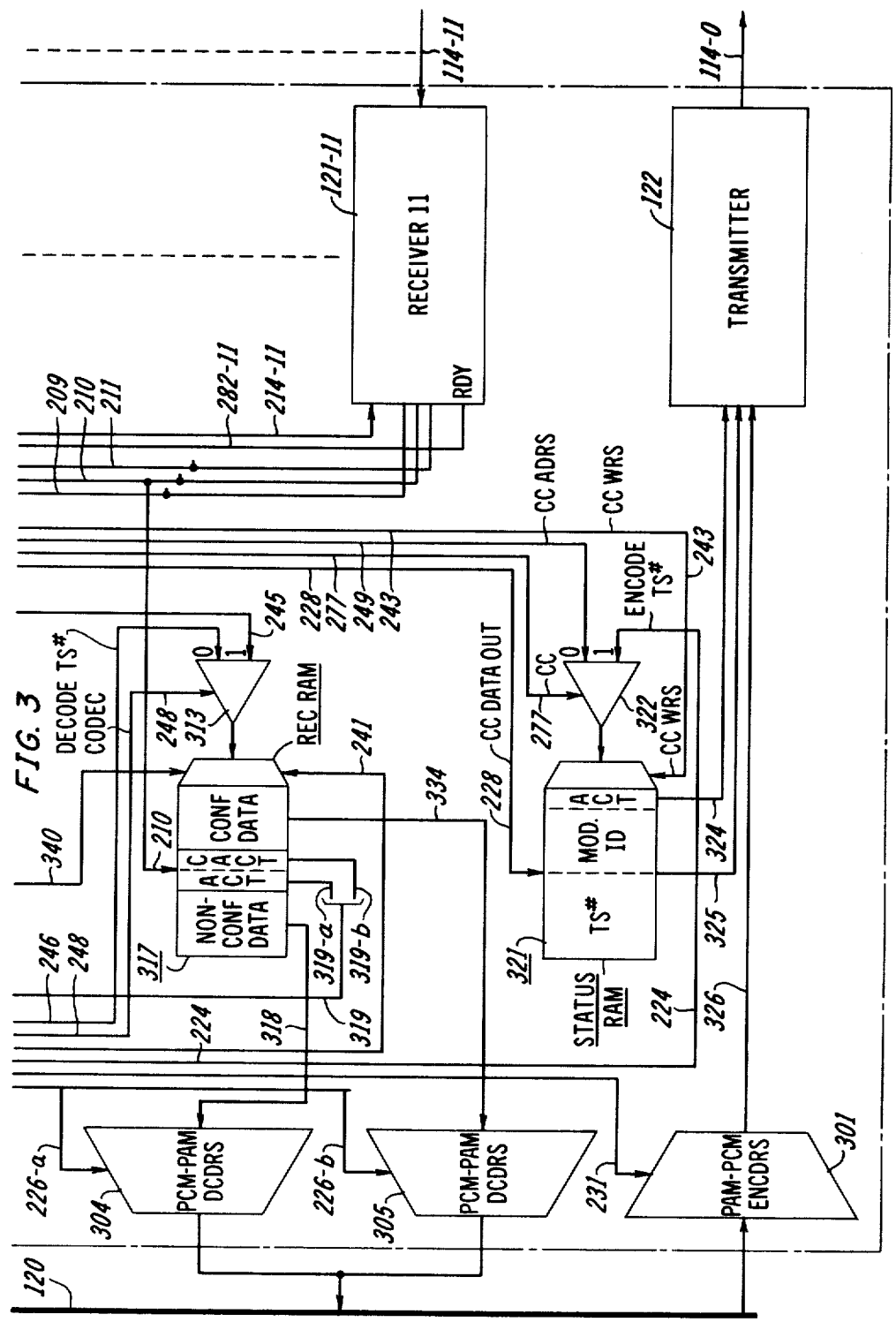

FIGS. 2 and 3 disclose further details of the system of FIG. 1 and, in particular, further details of intermodule links 117. Corresponding elements on FIGS. 1 and 2 are similarly designated. Receivers 1 through 11 and transmitter 122 are shown on the right-hand portion of FIGS. 2 and 3. The decoders 124 of FIG. 1 actually comprises the two groups of decoders 304 and 305 on the left-hand portion of FIGS. 2 and 3. Encoder 123 of FIG. 1 comprises the encoder 301 shown on the left-hand side of FIG. 3. The time slot interchange facilities 125 on FIG. 1 generally comprise the remainder of the circuitry shown in FIGS. 2 and 3, in particular, RAM 230 and RAM 317.

Let it be assumed that the circuitry of FIGS. 2 and 3 specifically comprises network module 105-0, and that it is serving the call described in the previous paragraphs. Thus, receiver 121-1 of module 105-0 currently receives call information in the form of a 21-bit word from module 1 over bus 114-1. This information is entered into line receiver 201 which separates the clock and data comprising each word and enters the received word (as shown on FIG. 10) into shift register 202. Receiver 201 applies a CLK signal to both control logic 253 and the shift register when a complete word has been received. In response to this signal, control logic 253 makes path 257 true (a binary 1) to enable one input of AND gate 256. PROM 255 is addressed over path 284 by the module ID field of the received word now in shift register 202. The PROM checks the validity of the received module ID field information by reading out useful information to FIFO 204 only if it receives the ID number for module 105-0. This allows each network module to have the same circuitry and to be customized by the appropriate programming of its PROM 255.

If PROM 255 is addressed with an erroneous module ID number, a word containing all 0s is read out of the PROM to prevent receiver 121-0 from responding further. Let it be assumed that the received word now in shift register 202 contains the proper module ID information and that, therefore, PROM 255 is addressed and read out with information that enables module 105-0 to respond further to the received word.

Figure 11:
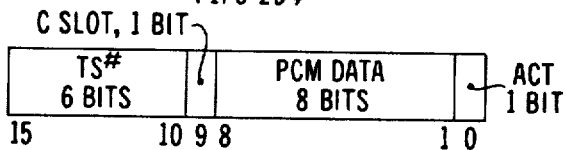
Figure 12:
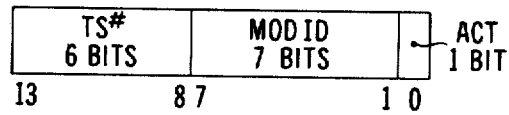
Figure 13:
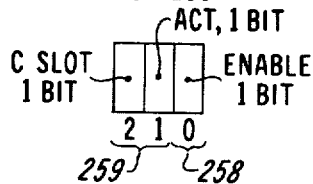

The information that is read out of PROM 255 has a word format as shown in FIG. 13. The bit 0 contains a 1 as an enable bit; bit 1 contains a 1 as an activity bit; and bit 2 is a 1 for a conference call and a 0 for a nonconference call. The enable bit (bit 0) is applied to conductor 258 which extends to the left input of AND gate 256. This fully enables the AND gate and it now applies a load signal to the LD input of FIFO 204. The LD signal writes FIFO 204 with the information on paths 259 and 281. The FIFO contents have the format shown in FIG. 11. The time slot information and the PCM data is received by the FIFO from shift register 202 over path 281 and it is written into the indicated fields as shown in FIG. 11. The information written in bit positions 0 and 9 is received from PROM 255 via path 259.

In summary of the preceding described operation, PROM 255 detects the receipt by shift register 202 of a word having a valid module ID number and, in turn, causes the time slot and PCM data information in the word to be entered into FIFO 204 along with information (bits 0 and 9) from PROM 255. This permits module 105-0 to respond further as required to serve the call. On the other hand, if a word having an invalid module ID number is stored in shift register 202, this condition is detected by PROM 255 and module 105-0 is prevented from responding.

Let it be assumed that a word having a valid module ID number is received, is loaded into FIFO 204 as above described, and is then shifted within the FIFO to its output. The FIFO makes its READY (RDY) terminal a 1 whenever a word is available on its output. The FIFO outputs can be tri-state and they are controlled by a signal applied to its enable (EN) input. A word at the FIFO output is read out onto paths 209, 210, and 211. The FIFO advances the next word within it to its output when the EN input goes to a 0. The FIFO may be composed of commercially available parts, such as a Fairchild 3341.

The following describes how information is read out of the FIFOs and entered into REC RAM 317. Control logic 205 causes multiplexors 207 and 208 to scan the RDY output 282 of the FIFO in each of the receivers 121-1 through 121-11 to detect the presence of an intermodule word in one or more of the FIFOs. As already mentioned, a binary 1 on terminal RDY and path 282 indicates that the receiver currently has an intermodule word available at the output of its FIFO; a binary 0 on path 282 indicates that its associated FIFO does not have a intermodule word ready at its output. Assume that a data word for the currently described call is now at the output of FIF0 204 within receiver 121-1 when it is scanned. This makes line 282-1 a 1.

Figure 8:
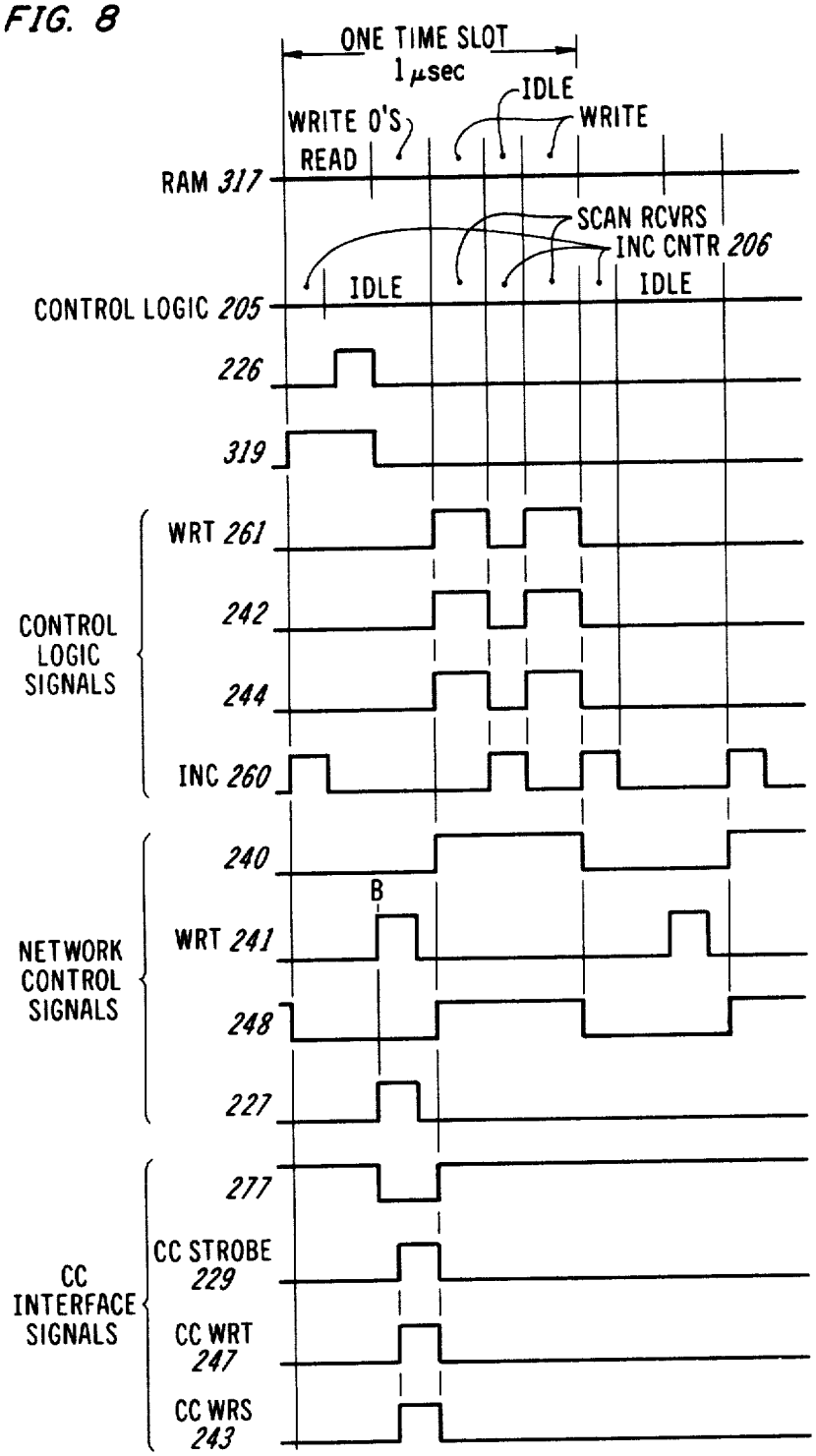
FIG. 8 is a timing diagram.

Once every time slot, as shown on FIG. 8, network control 115 applies a binary 1 over conductor 240 to timing generator 283 which causes it to produce the control pulses required by circuitry within logic 205. One output (path 260) of the timing generator controls the receiver scanning operation by incrementing counter 206 periodically. The counter's output is connected to the address input of multiplexors 207 and 208; and, therefore, the incrementing of counter 206 advances the multiplexors from position to position. This effectively connects the terminal on the left side of each multiplexor with each of the paths on their right side, one at a time, in sequence.

Multiplexor 208 extends a ground or binary 0 from its left side to the output terminal conductor 214 representing the current position of the multiplexor. Thus, the sequencing of this multiplexor through its various positions applies a ground to the EN input of the FIFO in each receiver in sequence, one at a time. The RDY outputs from the receivers are connected via paths 282 to the inputs of multiplexor 207. If the ready output of a scanned receiver on a path 282 is a 1, the multiplexor 207 extends the 1 to the middle input of AND gates 263 and 265. This 1 partially enables each of these gates.

Another input of these AND gates is controlled by the potential applied to line 211 which receives the output of bit 9 (CSLOT) of the scanned FIFO 204 as shown in FIG. 11. This bit is a 1 if the FIFO output represents a conference call; it is a 0 for nonconference call. Thus, the right-hand input of gate 263 is a 1 for a conference call and at such times, inverter 264 applies a 0 to the left-hand input of gate 265. For a nonconference call, path 211 is a 0, and the output of inverter 264 applies a 1 to the left-hand input of AND gate 265.

Timing generator 283 applies a pulse over path 261 to the remaining inputs of the two AND gates. This pulse fully enables either AND gate 263 for a conference call or AND gate 265 for a nonconference call. The output of these gates extends to the control circuitry for RAM 317 and causes information read out of a scanned FIFO to be written into RAM 317 as described in the following paragraphs.

The word read out of FIFO 204 of receiver 121-1 for the current call is placed on paths 209, 210, and 211. The information format of this word is shown in FIG. 11. Path 209 receives the time slot information (bits 10-15). Path 211 receives the C-slot bit (bit 9). Path 210 receives the PCM data plus (bits 1-8) and the activity bit (bit 0).

RAM 317 is shown diagrammatically on FIG. 3 as having a left half which is used for the serving of all intermodule calls and a right half which is used only on intermodule conference calls. PCM information and the ACT bit on path 210 are entered into the nonconference data field and the ACT field, respectively, on each intermodule call. For intermodule conference calls, an activity bit is entered into the CACT field and the PCM data is entered into the conference data field. The currently described call is of the nonconference type. Therefore, the C-slot bit on path 211 is a 0; AND gate 263 is not fully enabled; and AND gate 265 is fully enabled. The C-slot bit of 0 on path 211 is also extended upwardly on FIG. 2 to the control input of multiplexor 212 to set it to its 0 position in which its 0 input and path 209 is connected to its output on path 245. This permits the time slot information on path 209 to be extended to multiplexor 212, through it and out over path 245 to the 1 input of multiplexor 313. Multiplexor 313 is set to its 1 input at this time by a 1 on path 248 from network control. This extends the time slot information on path 245 through multiplexor 313 to the address input of RAM 317. RAM 317 is currently receiving on path 210 the ACT bit and the PCM data read out of FIFO 204. The left portion of the RAM is activated at this time since conductor 244 within path 340 is a 1 to indicate a nonconference call. The information on path 210 is now written into the left portion of the RAM with the time slot number on path 245 being used as RAM address information. For a conference type call, path 242 within path 340 would be a 1 and the right half of the RAM would be written with the information on path 210.

Figure 6:
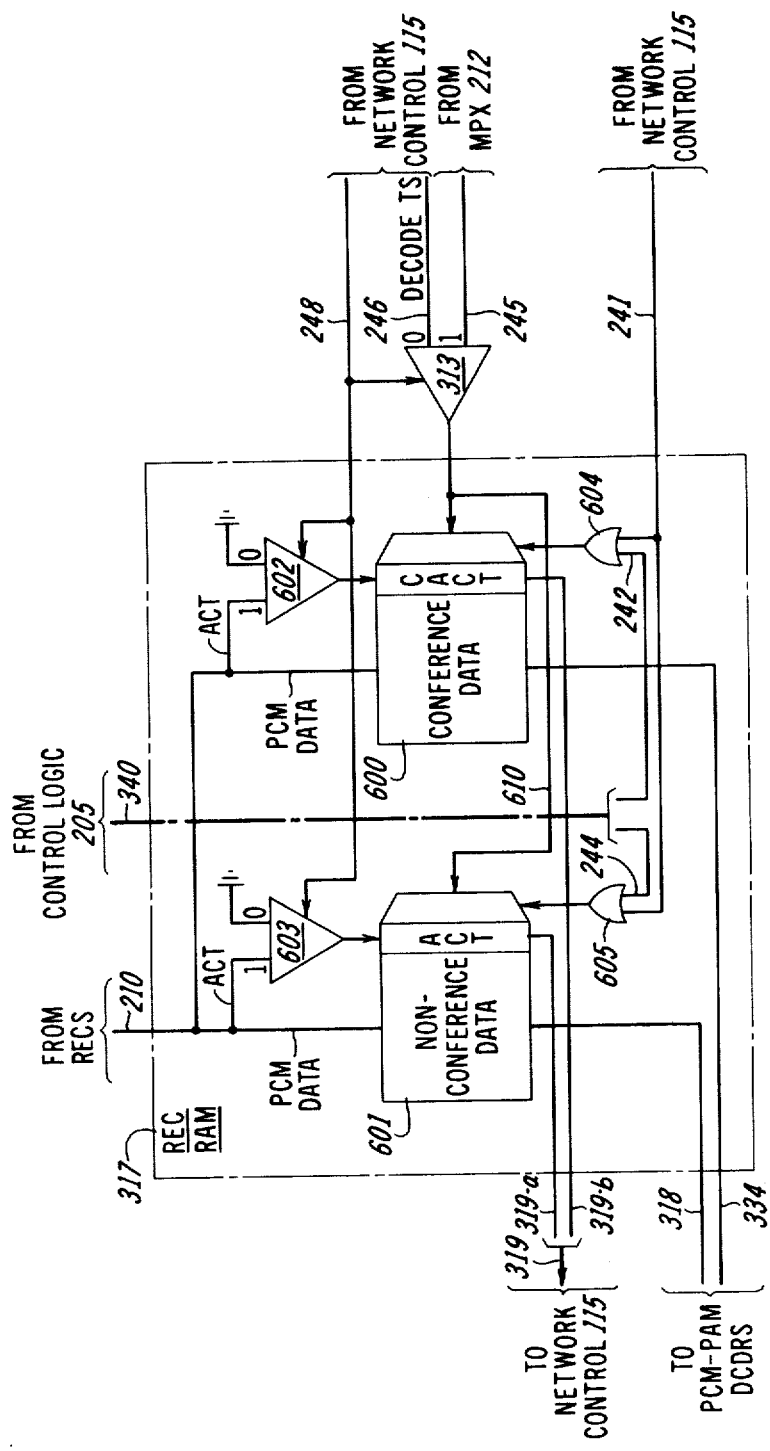
FIG. 6 discloses further details of RAM 317.

FIG. 6 discloses RAM 317 in additional detail. Specifically, RAM 317 comprises a conference RAM 600 and a nonconference RAM 601. On a nonconference call, path 244 is a 1 and, at such times, this 1 is extended through OR gate 605 to strobe RAM 601 which writes the PCM data and ACT bit on path 210 into its data field and ACT field under control of the time slot number on path 245 as address information. This address information is extended through multiplexor 313 and over path 610 to the address input of RAMs 600 and 601. This information from path 210 is applied to RAM 601 under control of a 1 on path 248 extending from network control 115. The 1 on path 248 activates the 1 input of each of multiplexors 313, 602, and 603. RAM 600 is not written at this time since path 242 is not enabled.

Network control 115 periodically sets the activity bit to 0 in each RAM 600 and RAM 601 location associated with an idle time slot. This is done at time B on line 241 of FIG. 8. Network control does this by (1) applying a 0 to path 248 to select the 0 inputs of multiplexors 313, 602, and 603, (2) by applying the appropriate RAM address information to path 246, and (3) by applying a strobe signal to path 241. The ground signal on the 0 input of multiplexors 602 and 603 enter a 0 as an ACT bit into the addressed RAM location. Note that as new call data is moved from receivers 121 to RAM 601 or RAM 600, 1s are written into the ACT fields of the addressed RAM location to replace the priorly written 0s.

Network module 105-0 receives words transmitted to it from other modules for other calls at the same time and in the same manner as for the currently described call. These other words are processed in the same manner as already described with each word being read out of a receiver 121 and entered into RAM 317.

The duty cycle of RAM 317 is subdivided into a read portion and a write portion for each system time slot. The system uses part of a time slot time to write received call information into RAM 317; it spends the remaining portion of the time slot time to read out the RAM. The potential on lead 248 selects the input of multiplexor 313 that is active at any given time. Lead 248 is a 1 when input 1 is active and at that time the ACT bit and the PCM data of the call word on path 210 are written into RAM 317 under control of the time slot information applied to the address input of the RAM.

Network control 115 makes lead 248 a 0 when RAM 317 is to be read out. At such times, network control applies time slot address information over path 246 via multiplexor 313 to the RAM to read out the current contents of a specified RAM location. If the readout ACT bit is a 1, indicating that the time slot is serving a call, network control 115 strobes the appropriate decoder 304 or 305 over path 226-a or 226-b and causes the information read out of the data fields to be entered into the decoder, translated from PCM to PAM form and applied to the PAM bus 120. For the current call, network control 115 applies a time slot number of 5 to path 246 to read out RAM 317 at its location 5. This applies the PCM data in RAM location 5 from the nonconference portion of RAM 317 to path 318, strobes decoders 304 over path 226-a when the ACT bit of 1 is read out and applied to path 319-a, causes the PCM data on path 318 to be entered into the decoder, translated to PAM, and to be applied to the PAM bus 120. All this occurs during the occurrence of system time slot 5 within network control 115. The information applied to PAM bus 120 at that time is then extended through port circuit 118-0 to station 109-0 which is assumed to be involved with the currently described call in module 0.

It was assumed in the previous paragraphs that the intermodule links 117 shown on FIGS. 2 and 3 comprise the intermodule links 117-0 of module 0 on FIG. 1. In connection with that assumption, it has been described how network module 0 receives an intermodule word over path 114-1 from module 1 during the serving of the current call. It was further described how this word was entered into receiver 121-1, and how it was subsequently read out of the receiver under control of control logic 205 and entered into RAM 317. It was further described how this information is read out of RAM 317 by network control 115, applied to the decoders 304, translated by them from PCM to PAM, applied to PAM bus 120, and from there extended through line port circuit 118-0 of FIG. 1 to station 109-0.

It was further described how network module 0 may also receive information for other intermodule calls over paths 114. Thus, module 0 can receive other call words from module 1 over path 114-1 representing other intermodule calls involving both modules 0 and 1. Similarly, module 0 can receive call words over other ones of the paths 114 from other network modules for the serving of intermodule calls involving module 0 and these other network modules.

It should be appreciated that all network modules contains circuitry identical to that of FIGS. 2 and 3. Therefore, for the present call involving modules 0 and 1, links 117 of network module 1 function in an identical manner to that already described to receive and process the call information transmitted to module 1 by module 0 over path 114-0.

The following describes how the circuitry of FIGS. 2 and 3 generates the call information words that are transmitted by module 0 to module 1 for the serving of the present call. Reference is made in this description to FIGS. 1, 2, 3, 5, 8, and 10. On FIG. 1, the words transmitted from module 0 to module 1 are transmitted over path 114-0 from transmitter 122 of module 0 to receiver 0 of module 1. Transmitter 122 and path 114-0 are shown on the lower right-hand corner of FIG. 3. The words that are transmitted over this path have the format shown in FIG. 10. Transmitter 122 forms this word from the information it receives from the various circuit elements of FIG. 3. The PCM data is supplied to the transmitter over path 326 by encoders 301. The time slot information and the module ID information are supplied over path 325 to the transmitter from the correspondingly designated fields of RAM 321. The ACT bit is supplied to the transmitter from the RAM over path 324. However, this bit is not in the transmitted word and is used only as a gating bit to advise the transmitter whether the time slot and module ID information read out of RAM 321 at a given address location does or does not represent that of an active call. Transmitter 122 responds to the information received over paths 324, 325, and 326; it forms the intermodule word shown in FIG. 10; and it applies this word to path 114-0. The word is received by and entered into receiver 0 of each of modules 1 through 11 as shown on FIG. 1. However, since the transmitted word contains the module ID if module 1, only the receiver of module 1 processes the word and enters it into its FIFO 204 for subsequent use. The word is ignored by the receivers of the other modules when their PROM 255 determines that the ID number in the word does not match that to which these other modules are programmed to respond.

The following describes in further detail how the circuitry of FIGS. 2 and 3 generates and transmits intermodule call words to other modules. The PAM information on bus 120 is applied to the encoders 301. The encoders contain the circuitry required to convert information from PAM to PCM form and to apply the converted information onto path 326. Encoders 301 receive timing signals from network control 115 via path 231. These signals control the interaction of the various elements comprising the encoders so that they respond to the PAM information on bus 120 for successive time slots, convert the PAM information for each active time slot into PCM form for each intermodule call, and apply the converted information to transmitter 122 via path 326.

Figure 5:
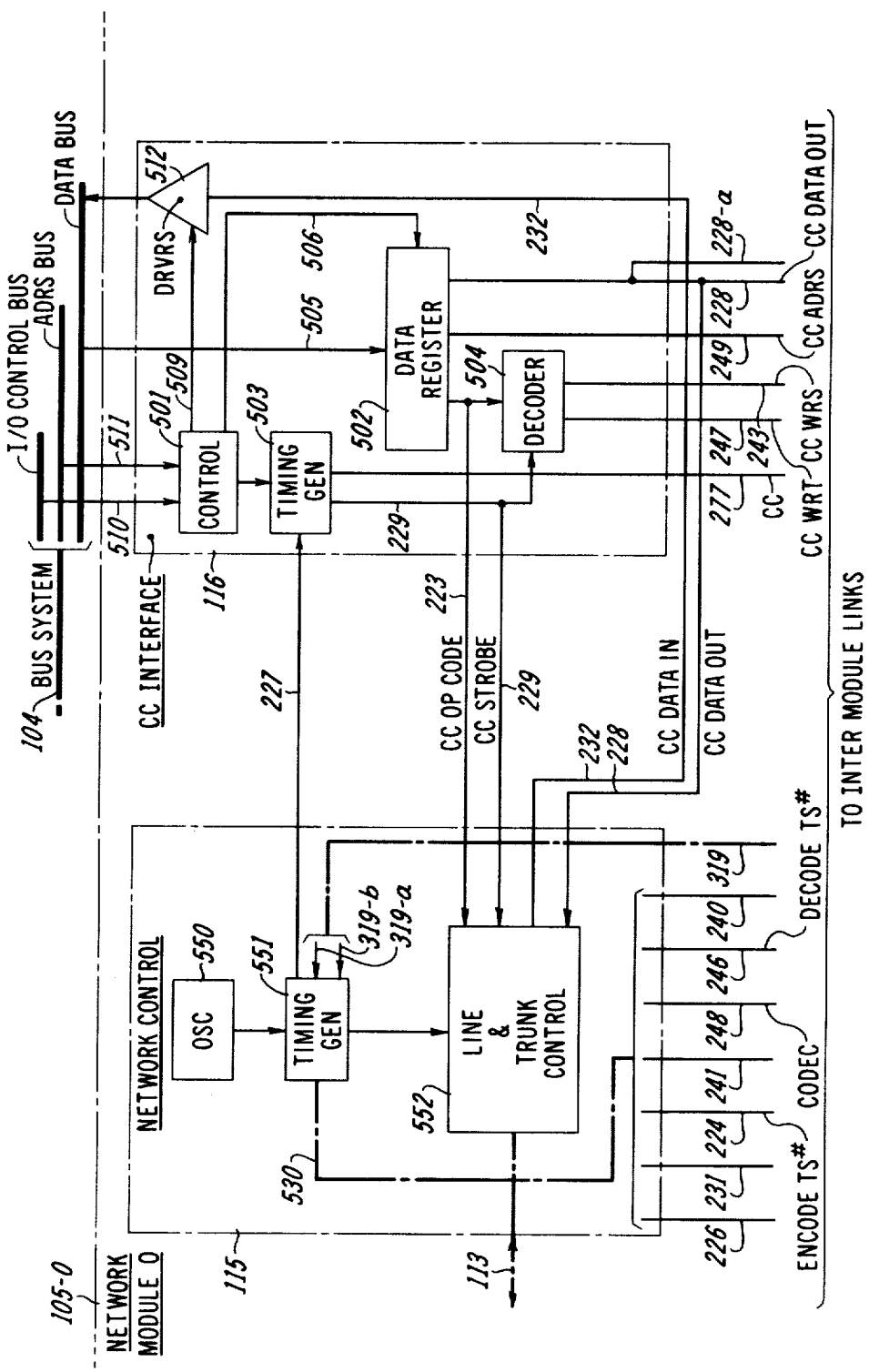
FIG. 5 discloses further details of network control 115 and CC interface 116.

The current call is assumed to be served in time slot 5 of module 0 and time slot 10 of module 1. Therefore, it is necessary that each word transmitted to module 1 for this call contain the module ID of module 1 as well as a time slot number of 10. Network control 115 and the CC interface 116 together enter into RAM 321 the information the RAM requires for serving the call. As soon as common control 101 of FIG. 1 determines the stations and modules that are involved on the current call, it applies information over bus system 104 to cause CC interface 116 and network control 115 to write the required time slot number and module ID number of module 1 in RAM 321 of module 0. With reference to FIG. 5, common control performs this operation by transmitting a data word having a format shown in FIG. 9 to register 502 of CC interface 116. At the same time, common control applies the necessary timing and control signals to control element 501 to activate timing generator 503. The timing generator drives lead 277 to a 0 state as shown on the timing diagram of FIG. 8. This lead extends to the control input of multiplexor 322 to cause it to connect its 0 input signalwise with the address input of the RAM 321. The 0 input of multiplexor 322 is connected to lead 249 which extends to the CC interface 116 and, within the CC interface, lead 249 extends to the output of the data register 502 field that receives the CC address bits as shown on FIG. 9. For the currently described call, these bits contain a binary 5 which is now applied as time slot address information to RAM 321. Lead 228 extending from the CC interface receives the contents of the time slot number and module ID number fields of data register 502. This information is now written into location 5 of RAM 321 under control of the address information on path 249. A time slot number of 10 is now written into the RAM since the currently described call is served by time slot 10 of module 1. The information written into the module ID field of RAM 321 is the appropriate ID number for module 1. Path 228 also writes a 1 in the ACT field of the RAMs to indicate an active call. Decoder 504 of the CC interface applies a strobe signal at this time to path 243. This signal is applied on FIG. 3 to the strobe input of the status RAM to cause it to write in its location 5 the information currently applied to it via path 228.

Common control changes the state of path 277 from a 0 to a 1 following the completion of this write operation. This change of state of path 277 occurs at the time shown in FIG. 8. The 1 now on lead 277 activates input 1 of multiplexor 322 so that the RAM may be controlled on a subsequent read operation by the time slot address information supplied from network control over path 224.

Timing generator 551 generates and applies to path 224 signals representing time slot numbers specifying the current state of module 0 for encoding operations. Each time slot numer that is applied to path 224 is extended through multiplexor 322 to the address input of RAM 321. The receipt of this address information causes the RAM to read out the contents of its three fields for the specified address. For the current call, when timing generator 551 applies a 5 to path 224 to represent time slot 5 for module 0, RAM 321 reads out the information currently stored in its location 5. The time slot field is a 10, the module ID is that for module 1, and the ACT bit is a 1 to indicate a currently active call. This information is applied to the transmitter 122 over paths 324 and 325. At the same time, encoders 301 apply over path 326 to the transmitter the encoded PCM information for the call served by this module during its time slot 5. The transmitter 122 combines the information received over paths 325 and 326 and forms a word having the format shown in FIG. 10. This word is transmitted to module 1 over path 114-0 and is served by module 1 in a manner analogous to that described for module 0. Specifically, the word transmitted by module 0 to module 1 is entered into receiver 1 of module 1, read out of its FIFO 204, entered into its RAM 317, read out of the RAM, applied to its decoders 304, converted from PCM to PAM by the decoders, applied to its bus 120, and extended through the appropriate line port circuit to station 130-0.

The above described readout of RAM 321 in module 0 is repeated during every occurrence of the time slot 5 encoding time in module 1. Network control applies other time slot numbers over path 224 to RAM 321 at other times, other locations of the RAM are read out, the read out information is combined with PCM information on path 326 to form other call words, and transmitter 122 transmits these other words to the other modules that may be involved with module 0 at this time in the serving of intermodule calls.

Figure 4:
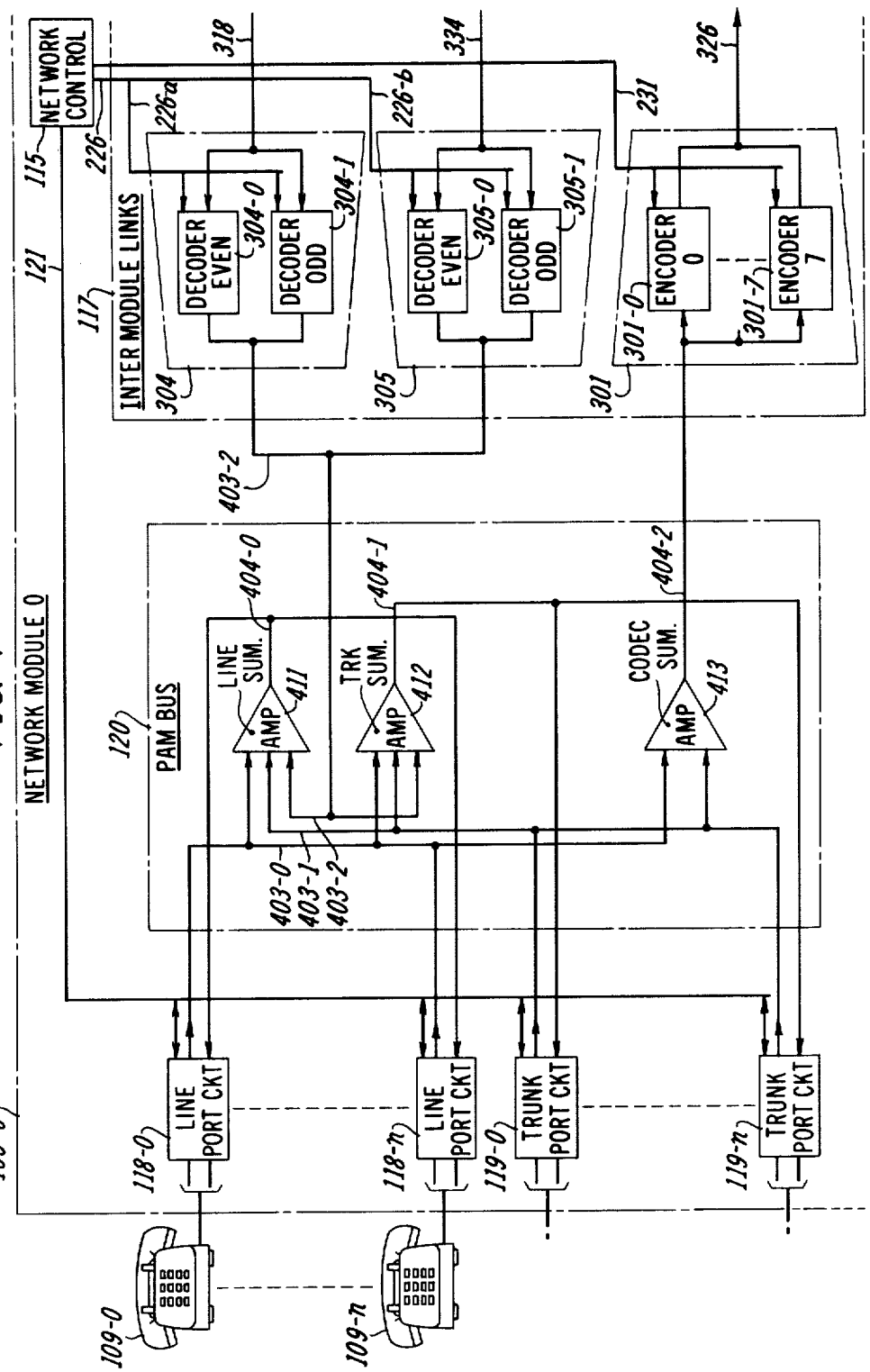
FIG. 4 discloses further details of the PAM bus 120, the decoder 304, and the encoders 301.

FIG. 4 discloses further details of PAM bus 120, decoders 304 and 305, as well as encoders 301. Encoders 301 of FIG. 3 comprise the plurality of individual encoders 301-0 through 301-7. Decoders 304 comprise the decoders 304-0 and 304-1. Decoders 305 comprise the decoders 305-0 and 305-1. These elements are well known in the art and may be similar to those used in the Bell System for the D3 channel bank data terminals of the T1 carrier system. The PAM bus 120 comprises amplifiers 411, 412, and 413 as well as input conductors 403-0 through 403-2 for the amplifiers and output conductors 404-0 and 404-1. Each decoder and encoder of FIG. 4 includes the required port circuits time division switches comparable to those in elements 118 and 119.

It may be assumed for the purposes of this description that the PAM buses operate on a 64-time slot basis with each time slot having a duration of approximately one microsecond. A D3 channel bank encoder can convert a PAM signal to PCM in approximately 5.18 microseconds. The encoders 301 operate the presently disclosed system at a slower rate and make a conversion from PAM to PCM in approximately 8 microseconds. Thus, each encoder 300 encodes only every eighth time slot. For example, encoder 301-0 encodes time slots 0, 8, 16, 24, 32, 40, 48, and 56. Encoder 300-1 encodes time slot 1, 9, 17, 25, 33, 41, 49, and 57. Encoders 300-2 through 300-7 function in a similar manner with regard to the remaining time slots. Network control 115 controls the operation of the encoders via bus 231 in such a manner so as to cause the appropriate encoder to place its encoded output information on path 326 after the encoder has converted its PAM input information to PCM form. Thus, every microsecond of system operation, a different encoder places a PCM data word onto path 326 which on FIG. 3 extends to the input of transmitter 122. Each decoder element 304 and 305 converts PCM data to PAM form with a delay of approximately one microsecond. On nonconference calls, only decoders 304-0 and 304-1 are used and each decoder serves alternate time slots. Decoders 305 function in a similar manner for conference type calls.

The following describes how the circuitry of FIG. 4, which is assumed to be in module 0, functions in connection with the currently described call. The call is being served by module 0 in PAM time slot 5, and station 109-0 and line port circuit 118-0 are involved on the call. Port circuit 118-0 places PAM information on path 403-0 that is applied to inputs of amplifiers 411, 412, and 413. This information is extended through amplifier 413 and out over path 404-2 to the input of the encoders 301. Encoder 301-5 serves PAM time slot 5, it encodes the PAM information it receives on path 402-2 to PCM form and, with a delay of seven microseconds, it applies this PCM information over path 326 to the transmitter 122.

The conversion of information from PAM to PCM by the encoders takes a finite time interval, namely seven microseconds and, thus, the PCM information for a given time slot appears on path 326 seven time slots subsequent to the time slot in which the PAM information is applied to the encoder input. For the current call, encoders 301 receive the PAM information during PAM time slot 5 and apply it out onto path 326 in PCM form during PAM time slot 12.

Decoders 304 receive the PCM information for the currently described call; they decode it; and they apply it to the PAM bus conductor 403-2 during each occurrence of PAM time slot 5. Decoder 304-1 serves the odd numbered PAM time slots and therefore it is active during each occurrence of PAM time slot 5. PCM information for the call is read out of RAM 317 and applied over path 318 to decoder 304-1. It decodes the information from PCM to PAM, applies it over path 403-2, through amplifier 411, over path 404-0, through line port circuit 118-0 to station 109-0. Each decoder takes approximately one microsecond to perform its decoding function. Therefore, since decoder 304-1 must apply its output information for the present call onto the PAM bus 120 during PAM time slot 5, it must receive the PCM data that is to be decoded one microsecond earlier. This requires that path 246 (FIG. 3) apply a 5 as address information to the RAM 317 during each occurrence of PAM time slot 4.

A similar relationship exists between the currently active time slot on PAM bus 120 and the encode time slot number applied to RAM 321 over path 224. It has already been mentioned that each encoder 301 on FIG. 4 takes approximately seven microseconds to convert received PAM information to PCM. For the current call, encoder 301-5 receives PAM information on path 404-2 during PAM time slot 5, and after a seven microsecond delay applies the information onto path 326 in PCM form during the occurrence of PAM time slot 12. Because of this, network control 115 must apply a time slot number of 5 over path 224 to the address input of RAM 321 not during the occurrence of PAM time slot 5, but rather, during the occurrence of PAM time slot 12 since it is at this time that the information for PAM time slot 5 appears in PCM form on path 326.

Figure 7:
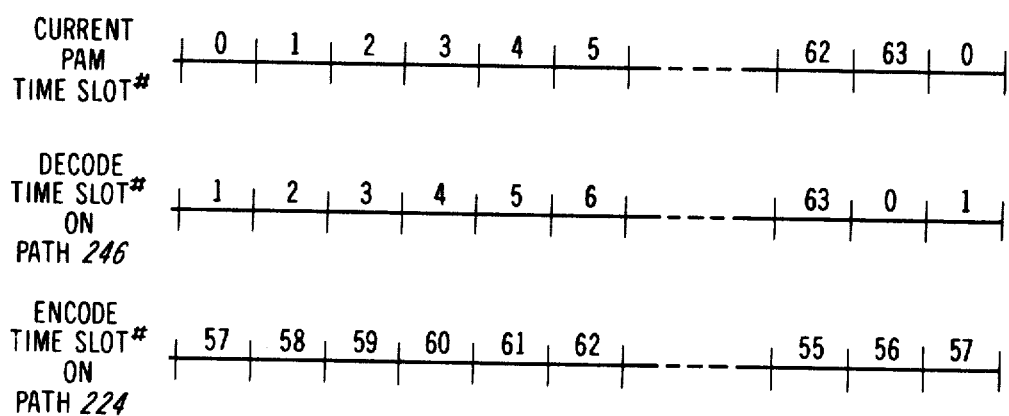
FIG. 7 portrays the time at which time slot address signals are applied to paths 224 and 246.

The time relationship described in the preceding paragraphs is shown on FIG. 7. The top line indicates the currently active PAM time slot. It can be seen, on the second line, that the system applies a time slot address of 5 to path 246 to read out location 5 of RAM 317 during the occurrence of PAM time slot 4. This is required because of the one-microsecond delay in the decoders. It can further be seen that by comparing the top and bottom lines that network control applies a time slot address of 62 over path 224 to RAM 321 during the occurrence of PAM time slot 5. This is necessary since the information that was applied to the encoders during PAM time slot 62 does not appear in PCM form at the output of the encoders until seven microseconds later, namely until the occurrence of time slot 5.

The summing amplifiers 411, 412, and 413 are similar to those well known in the art and, in particular, to those currently used in the DIMENSION ® PBX manufactured by the Western Electric Company. The same comments are applicable to the line port circuits 118 and the trunk port circuits 119.

Decoders 305 are similar to decoders 304. All of the decoders are controlled by timing signals transmitted to them from network control over paths 226-a or 226-b. The signals on paths 226 cause each decoder to be active during the occurrence of the assigned time slot. The signals on path 231 cause each encoder 301 to be active during its assigned time slot.

Conference Call Description

The following describes how the system of the present invention serves a conference call involving station 109-0 of module 0, 130-0 of module 1, and 140-0 of module 11. Let it be assumed that module 0 serves the call during time slot 5, module 1 during time slot 10, and module 11 during its time slot 23.

Each module can transmit only a single call word at a time to the other modules. Therefore, the serving of a conference call requires that a transmitting module such as module 0 apply a word to bus 114-0 and that each of the other two modules on the call, namely module 1 and module 11, receive and respond to the transmitted word, process it, and apply the "speech" information contained in it to the station involved on the call within the module. It has been described how each module transmits an intermodule word to the other module on nonconference intermodule calls and how the ID number contained in each transmitted word is the mechanism by which the receiving module determines that it is to receive and respond to the transmitted word. On such calls, the transmitted module ID number specifies a unique module.

Each module serving a conference call transmits a word containing a special module ID number that specifies the plurality of modules that are to receive and respond to the word. Each time module 0 transmits an intermodule word pertaining to the present conference call, it inserts into the word a special ID number that specifies that both modules 1 and 11 are to respond. This word is applied by module 0 to path 114-0 and is entered into receiver 0 of both modules 1 and 11.

Each module involved on a conference call receives intermodule words from all other modules serving the call. The "speech" information contained in each of these words must be processed by the the receiving module and applied concurrently to its PAM bus 120. Thus for the present call, module 0 receives a word over path 114-1 from module 1 and also receives a word from module 11 over path 114-11. With reference to FIGS. 2 and 3 and assuming the circuitry shown on these figures to be part of module 0, the word it receives on path 114-11 is processed in the manner described priorly for a nonconference call and is read out of the left-hand portion of RAM 317 and applied by decoders 304 to PAM bus 120 during PAM time slot 5. At the same time, the word module 0 receives from module 1 on path 114-1 is processed by receiver 121-1; the word is written into the conference portion of the RAM 317;

it is subsequently read out of the RAM into decoders 305; and is applied by decoders 305 to PAM bus 120 concurrently with the information read out of the left-hand portion of the RAM and applied by decoders 304 to the PAM bus.

FIG. 14 shows the module ID and time slot information that is contained in each of the intermodule words transmitted between modules for the present conference call. It can be seen that module 0 transmits an intermodule word to module 1 and 11, that the module ID number contained in this word is a 33, that module 1 serves the call in time slot 10, that module 11 serves the call in time slot 23, and that the word contains a 10 in its time slot field. For the currently described call, module 0 transmits to modules 1 and 11 an intermodule word that contains a module ID number of 33 and a time slot number of 10. Module 1 processes this word in the same manner as for a nonconference call since the received word correctly specifies the time slot number in which module 1 is to serve the call. However, module 11 must first convert the received time slot information of 10 to a 23 in order to process the word.

Each module on a conference call receives an intermodule word from each of the other modules involved on the call. For the present call, module 0 receives a word from module 1 over path 114-1 on FIG. 1. It also further receives a word from module 11 on path 114-11. As shown on FIG. 14, the word received by module 0 from module 1 has a module ID of 133 and a specified time slot of 23. Module 0 determines that this is a conference call from the module ID number and serves the call during its PAM time slot 5 even though the received word specifies time slot 23. The word that module 0 receives from module 11 has a module ID number of 12 and it contains a 5 in its time slot field. Module 0 processes this word in the same manner as for a nonconference call since the received word correctly specifies the time slot in which module 0 is to serve the call.

FIG. 15 discloses the spectrum to module ID numbers that are used to serve both conference and nonconference calls. Column a contains the module ID numbers 0 through 11; they are used on nonconference calls; and each module ID number in this series directly specifies the receiving module. In other words, a module ID of 0 indicates an intermodule word to which module 0 is to respond; a module ID of 1 specifies module 1, and so on for the remainder of the module ID numbers through 11. Columns b, c, and d contain the module ID numbers 12 through 143. These numbers are used on conference type calls and, on each such call, one module is designated as being in the normal call serving mode while the other mode is in the conference call serving mode. Thus, for a module of ID 12, module 0 is in the normal mode and module 1 is in the conference mode. This means that module 0 serves the received call word in the same manner as it does for a nonconference call. However, module 1 processes the word by first converting the received time slot number to that of the time slot in which the module is to serve the call.

The manner in which the various modules serve calls for the remainder of the ID numbers 13 through 143 may be determined from columns b, c, and d on FIG. 15. For module IDs 12 through 22, module 0 serves each call word in the normal manner. The modules in the subcolumn designated "CONF MODE" receive the words for the indicated module IDs and process each received word in the conference mode. Similarly, module 1 is in the normal mode for IDs 23 through 33 while the modules in the subcolumn designated "CONF MODE" serve these call words by converting the received time slot number in the received word to that of the time slot in which each such module can serve the call. A similar relationship exists between module IDs and modules for the remainder of the ID numbers including 133 through 143.

For the currently described call, the word transmitted by module 0 to modules 1 and 11, contains a module ID of 33. On FIG. 15, it may be seen that the receiving modules for a module ID of 33 are modules 1 and 11. It may be further seen that module 1 processes this word in the normal manner while module 11 processes it in the conference mode.

The following paragraphs describe how the circuitry of FIGS. 2 and 3, which is assumed to be in module 0, receives call words from module 1 and module 11 in connection with the presently described conference call. It is described how module 0 processes both of these words and applies the "speech" information in them onto PAM bus 120 for transmission to station 109-0 via line port circuit 118-0. It can be seen on the top two lines of FIG. 14 that module 0 receives a first call word from module 1 with a module ID of 133. This word contains a time slot number of 23 even though module 0 is currently serving the call in its PAM time slot 5. The circuitry of module 0 must therefore convert the received time slot number of 23 to a 5 to serve the call. It further can be seen on FIG. 14 that module 0 receives a second call word containing a module ID of 12, that this word is received from module 11, and that the word contains a time slot number of 5. Module 0 processes this call word in the same manner as for a nonconference call word since the time slot number in the received word matches the time slot in which the module 0 is serving the call.

The following paragraphs further describe how the PCM samples in the two received words are entered into RAM 317, subsequently read out of the RAM and applied to decoders 304 and 305, converted by them from PCM to PAM, placed on the PAM bus during each occurrence of PAM time slot 5, and from there extended through line port circuit 118-0 to station 109-0.

The word that is transmitted by module 11 to module 0 is of the type shown in FIG. 10 and is received by module 0 on path 114-11 and entered into its receiver 121-11. This word is processed by the receiver in the manner priorly described in connection with the serving of a nonconference calls by module 0. In the course of this processing, the FIFO 204 of receiver 121-11 is written with a word having the format shown in FIG. 11. The time slot field of this word contains a 5, the C-slot bit is a 0 since the time slot information in the received word correctly specifies the time slot in which this module serves the call. The PCM data field contains the "speech" information for the call. The activity (ACT) bit is a 1 to indicate on active call. The information in the FIFO of receiver 121-11 is read out onto paths 209, 210, and 211 when this receiver is scanned by the control logic 205 and multiplexors 207 and 208. The time slot information is read out onto path 209, extended through multiplexor 212, through multiplexor 313 to address RAM 317 with a time slot number of 5. The 0 on path 211 activates gate 265 which causes the PCM data field information and the activity bit on path 210 to be written into the correspondingly designated left-hand portions of RAM 317.

The word that module 0 receives from module 1 for this conference call is received on path 114-1 and is entered into the shift register 202 of receiver 121-1. The received module ID number of 133 addresses a location of PROM 255 which generates output information specifying that module 0 is to process this word with the use of its conferencing facilities. FIFO 204 is written with a word of the type shown in FIG. 11. This word has a time slot number of 23, and a C-slot bit of 1. The FIFO is subsequently read out under the control of multiplexors 207 and 208, and the C-slot bit of 1 on path 211 activates gate 263. This causes RAM 317 to write the information it receives on path 210 into its right-hand fields. The time slot number of 23 is read out of the FIFO onto path 209 and applied to the 1 input of multiplexor 233 whose control input is set to a 1 at this time by CC interface 116 over path 277. The time slot information is therefore extended through the multiplexor to the address input of RAM 230. The conference RAM 230 is priorly initialized by network control and CC interface 116 with information which enables it to translate a received time slot number at its input to the time slot number in which the module can serve a conference call. This is done as part of an initialization procedure by CC interface during which it applies the required strobe signals to path 247 and the required translation information to path 228-a. For the currently described call, when RAM 230 receives a time slot number of 23 at its address input, it reads out a time slot number of 5 to the 1 input of multiplexor 212. The 1 input of the multiplexor is active at this time because of the C-slot bit of 1 which is applied to path 211. Thus, the time slot number of 5 is passed through multiplexor 212, applied to the 1 input of multiplexor 313, and extended through it to the address input of RAM 317. A conference activity bit of 1 and the PCM data now on path 210 are written into the right-hand fields of RAM 317s.

At this time, the "NON CONF DATA" field of location 5 of RAM 317 contains the PCM data for the call word received by receiver 121-11 that was processed in the same manner as for a nonconference call. Further at this time, the "CONF DATA" field of location 5 of RAM 317 contains the PCM data for the call word received by receiver 121-1 that was processed during conference RAM 230 for time slot translation purposes. Both activity fields (ACT and CACT) now contain a 1.

Subsequently, network control 115 changes the state of path 248 from a 1 to a 0 and applies time slot address information to path 246 to read out RAM 317. When path 246 applies a time slot number of 5 to RAM 317, all fields of the RAM are read out with the nonconference data field information being applied to decoders 304 and with the conference data field information being applied to decoders 305. These decoders convert the received PCM information to PAM and apply it to PAM bus 120. From there, it is extended through line port circuit 118-0 to station 109-0.

The preceding paragraphs have described how the circuitry of FIGS. 2 and 3 receives two different intermodule call words on a conference type call, writes the pertinent information into the two halves of RAM 317, and reads out the RAM contents into decoders 304 and 305 which convert the information from PCM to PAM and extend it over PAM bus 120 to station 109-0.

The serving of the current conference call requires transmitter 122 of module 0 to generate an intermodule call word that is to be applied over path 114-0 to both module 1 and module 11. As shown on FIG. 14, this transmitted word has a time slot number of 10 and a module ID number of 33. This word is generated by transmitter 122 in the same manner as priorly described for the nonconference type call under control of RAM 321. Common control 101 determines that the currently described call is of the conference type; it determines the call information that must be transmitted between modules in order to serve the call; it writes a time slot number of 10 in the time slot field of RAM 321; it writes a module ID of 33 in the module ID field; and it writes a 1 in the activity field. The word to be transmitted by module 0 is formed each time path 224 applies a PAM time slot number of 5 to the address input of RAM 321 via multiplexor 322. At such times, RAM 321 is read out and applies a time slot number of 10 and a module ID number of 33 to transmitter 122 over path 325. The transmitter combines that information with the PCM information for the call on path 326 and forms a word that is transmitted over path 114-0 to modules 1 and 11.

A word of this type shown on FIG. 13 is read out of PROM 255 whenever the PROM receives an ID number as address information from shift register 202 via path 284. For ID numbers to which the module is to respond, a word is generated having a 1 for the enable bit, a 1 for the activity bit, and a 0 or a 1 for the C-slot bit. The C-slot bit is a 1 when the circuitry of FIGS. 2 and 3 is to process the word with the use of the conference RAM 230 for a conference type call. The C-slot bit is a 0 for nonconference calls and for conference calls when the received word is to be processed in the same manner as for a nonconference call and entered into the left half of RAM 317. A valid word of the type shown in FIG. 13 is not generated by PROM 255 upon the receipt of intermodule call words containing ID numbers to which module 0 is not to respond. In such cases, all three bits of the word shown on FIG. 13 are 0.

Description of FIG. 5

FIG. 5 discloses further details of network control 115 and CC inferface 116. The CC interface is directly controlled by information transmitted to it from common control 101 via the bus system 104. Common control performs this function by transmitting a data word to CC interface over the data bus and by transmitting appropriate address and control signals over the I/O and address bus to control element 501. The information on the data bus is applied to data register 502 over path 505 and is gated into the register by means of a signal on path 506 from control 501. The word format of the information in the data register is shown on FIG. 9.

Upon receipt of a complete word, control 501 generates a word complete signal which is applied to the timing generator 503. This signal conditions the timing generator to react to a true signal, a binary 1, on path 227 from the timing generator 551 of network control 115. Timing generator 503 reacts to the signals on path 227 and the output of control 501 as shown on the timing diagram of FIG. 8. Timing generator 503 generates a pulse on path 229 which strobes the decoder 504, as well as the line and trunk control 552 of network control 115. Timing generator 503 also applies a signal to path 277 which is extended on FIGS. 2 and 3 to the control inputs of multiplexors 233 and 322 to determine the multiplexor input that is to be active.

Figure 9:
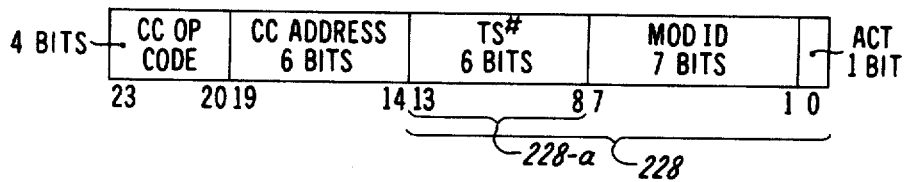
FIGS. 9 through 13 disclose the word format of the information stored in various registers and memories of the system.

Decoder 504 receives the OP-CODE field output of data register 502 as shown on FIG. 9. The decoder decodes the 4-bit OP-CODE and generates two different output signals. If the OP-CODE designates that the conference RAM 230 is to be written, an active signal is applied over path 247, (also designated CCWRT) to the strobe input of RAM 230 to write it with the information currently on path 288-a. The information on path 228-a contains the time slot information stored in register 502 as shown in FIG. 9. If the OP-CODE indicates that RAM 321 is to be written, a signal is applied by the decoder to lead 243, also designated CCWRS. The signal is applied to the strobe input of the RAM 321 to write it with the information currently on path 228, also designated CC DATA OUT. Only the OP-CODE, address, and time slot fields of FIG. 9 contain valid information when the RAM 230 is to be written. All fields contain information when the status RAM 321 is to be written.

Common control 101 writes into status RAM 321 and conference RAM 230 using the CC interface 116 as above described. It also interfaces via the CC interface to network control 115. Common control uses this connection to network control to perform the functions of distributing the network orders and scanning the network status. This function is accomplished by causing CC interface 116 to transmit to network control 115 signals on paths 223 (CC OP-CODE), 229 (CC STROBE), 232 (CC DATA IN), and 228 (CC DATA OUT). Network control 115 decodes the CC OP-CODE and performs the necessary control functions.

Network control 115 comprises an oscillator 550, a timing generator 551, and a line and trunk control element 552. The oscillator runs at appropriate frequency to generate the time base signal required for timing generator 551. The timing generator 551 applies a signal periodically to path 227 to control timing generator 503 of CC interface 116. The timing generator 551 also applies the required signals to the conductors within path 530 to control the circuitry of FIGS. 2 and 3. The line and trunk control 552 exchanges the indicated information with the CC interface on paths 223, 229, 232, and 228 to perform its required operations. The output signals generated by the line and trunk control are applied to path 113 which, as shown on FIG. 1, extends to the module port circuits to control them in their operation and, in particular, to advance the time slot shift register within each port circuit. The line and trunk control 552 also performs scanning operations to determine the current hook status of each port circuit. The information derived by the line and trunk control is transmitted over path 232 to the driver amplifier 512 within the CC interface. From there, the information is extended under control of the strobe signal on path 509 to the data bus and back to common control. The line and trunk control element is not shown in further detail since its details comprise no part of the present invention and are well known in the art.

The following paragraphs describe the nature and purpose of the signal transmitted over each circuit path on FIG. 5. Path 227 applies a signal from the timing generator 551 to the timing generator 503 to activate timing generator 503 only when a binary 1 is applied to path 227. Paths 319 apply the ACT and CACT activity bits from RAM 317 to timing generator 551 to advise it whenever a RAM 317 location is read that pertains to an active call. Path 223 applies the OP-CODE information in data register 502 to the line and trunk control element 552. Path 229 applies a strobe signal to element 552 from timing generator 503. Path 228 applies the time slot and module ID field of the word in register 502 to line and trunk control 552. Path 232 applies the output information generated by element 552 via amplifier 512 to bus system 104. Path 226 applies the control signals required by decoders 304 and 305 to determine which decoder is to be the active at any given instant of time. Path 231 performs the same function with respect to the encoders 301. Path 224 extends to multiplexor 322 to supply encode time slot address information to status RAM 321. Path 241 applies a strobe signal to RAM 317. Path 248 applies control signals to the control input of multiplexor 313 to determine which of its inputs is to be active. Path 246 extends to the 0 input of multiplexor 313 to supply decode time slot address information to RAM 317. Path 240 applies timing signals to control logic 205. Path 319 receives the activity bit information read out of RAM 317 and applies it to the timing generator 551. Path 277 extends to the control input of multiplexors 233 and 322 to determine which of their inputs is to be active. Path 247 applies a write strobe signal to conference RAM 230. Path 243 applies a strobe signal to status RAM 321. Path 249 applies time slot address information to the 0 inputs of multiplexors 233 and 322. This time slot information is used when common control causes CC interface 116 to write call establishment information into either of RAMs 230 or 321. Path 228 is used to write time slot and module ID information into status RAM 321. Path 228a is used to write time slot translation information into conference RAM 230.

Description of FIG. 8—Timing Diagram

The following describes the system functions portrayed on the timing diagram of FIG. 8. The top of the figure indicates the time allocated to one time slot which is approximately one microsecond. The lines below the one time slot indication are subdivided into time segments and each such line portrays the wave form applicable to the signal on the line during each segment.

The top line is designated "RAM 317" and the segments within the "one time slot" interval indicate the function performed by the RAM during a single time slot. The first interval is termed "read" and during this interval the information in RAM 317 is read out and applied to the decoders 304 and 305 under control of signals applied to RAM 317 by network control 115. The signals received by the RAM and its associated circuits during this interval are a 0 on path 248 extending to multiplexor 313 to activate its 0 input. A second signal received is PAM time slot address information on path 246. This information specifies the address locations of the RAM 317 that is to be read out.

Following the read interval, an interval follows termed "write 0s". During this interval, common control writes 0s in the portion of the RAM that was read out in the earlier segment of the time slot. The 0s are generated and written into the activity field of the RAM by the circuitry shown in detail on FIG. 6. In the next portion of the time slot, the RAM is written with the information read out of a receiver FIFO that is currently being scanned by control logic 205. The multiplexors 208 and 207 are set to the position representing the scanned receiver during the first portion of the time slot which is designated increment counter 206 on the second line of FIG. 8. This is the leftmost time segment on the second line. Following this increment, and when the write segment for the RAM occurs, control logic 205 is in a scan mode, as shown on the second line, so that the information read out of the scanned received FIFO via path 210 is written into RAM 317. At this time, common control applies a 1 to path 248 to activate the number 1 input of multiplexor 313. During this write interval, the address for the RAM is supplied by the time slot number in the word read out of the scanned FIFO.

Next, with reference to the top two lines of FIG. 8, RAM 317 encounters an idle segment while the control logic 205 increments counter 206. In the last segment, the time slot control logic 205 scans another receiver and the information read out of the scanned receiver is written into RAM 317.

It should be noted that the counter 206 is incremented twice during the time slot, two receivers can be scanned and there can be two write operations into RAM 317 even though there is only one read operation. There are two reasons why there is a single read operation and two possible write operations. First, this ensures that all receivers will have their FIFO registers read out so that no newly received word will be lost due to lack of available space in a FIFO. Secondly, during periods of time in which conference calls are being served, it is necessary that more than one write operation be performed in a single time slot since two write operations must be performed on RAM 317 for each readout operation involving a conference call.

It should be understood that the time slot information that is applied to RAM 317 to read it out during the read portion of the time slot is not normally the same time slot number that is applied to the RAM during the write segment of the time slot. The reason for this is that time slot address information is applied to the RAM by network control 115 during the RAM readout while time slot address information on write operations is supplied by the time slot field of the intermodule word whose data field information is currently being written into the RAM.

The third line on FIG. 8, the line designated 226, represents the wave form for path 226. The signal is a strobe or control signal that is applied to decoders 304 and 305 when they are to receive to the information read out of RAM 317 and applied to them on either path 318 or 334 or both, depending upon the nature of the call. The next line, 319, portrays the signal that is applied to path 319 when the activity bits are read out of RAM 317 and applied to the network control and, in particular, to the timing generator 551 within network control as shown on FIG. 5. This path 319 receives the indicated positive signal only in the event that the read out RAM 317 location is associated with an active call and therefore has an activity bit of 1 in either one or both of its activity fields.

The next line portrays the positive going strobe signals that are applied by timing generator 283 to path 261 during the write segment of RAM 317. These signals enable either AND gate 263 or 265 to apply a strobe signal over path 340 to write data into either the left or the right portion of RAM 317. The signal on path 261 is generated during each time slot. However, the strobe signal on path 340 is generated only if an intermodule word is currently read out of a scanned receiver 121. The next two lines, the lines designated 242 and 244, represent the above discussed strobe signals which are generated in response to the signal on path 261 whenever an intermodule word is read out of the scanned receiver. One or the other of the 242 and 244 signals are generated—but not both—depending upon the nature of the call.

The next line indicates the wave form on path 260. These signals increment counter 206 during the indicated time slot segments. The signal on line 240 represents the wave form that is applied to timing generator 283 of control logic 205 to cause the timing generator to generate the control signals required to apply the strobe pulse to path 261 as well as to apply the increment signal on path 260 for counter 206. The line designated 241 portrays the signal that is applied as a strobe input to RAM 317 on a write operation when network control is writing 0s into the RAM 317 location that has just been read out. The line designated 248 indicates the wave form of the signals that are applied to the control input of multiplexor 313 to control which of its inputs is to be active. The wave form is a 0 during the first half of the time slot when network control supplies time slot address information to RAM 317 via the 0 input of multiplexor 313. The wave form assumes a positive 1 value during the second half of the time slot when the RAM is written under control of time slot address information supplied by the intermodule word read out of the scanned receiver.

Wave form 227 indicates the time slot segment in which the timing generator 551 generates a positive pulse and applies it to conductor 227 for transmission to the timing generator 503 of CC interface 116. The reception of this pulse causes timing generator 503 to perform the functions priorly described in connection with the discussion of CC interface 116. The wave form designated 277 indicates the time at which the signal applied to path 277 switches from a binary 1 value to a binary 0 value. When path 277 receives a binary 1 signal, multiplexor 233 and conference RAM 230 receives time slot address information from the receiver that is currently being read out. RAM 321 and multiplexor 322 then receive time slot address information from network control. When path 277 receives a binary 0, the 0 input of each multiplexor is activated and, during such time, RAMs 230 and 321 receive time slot address information supplied from CC interface 116 via path 249. During such times, conference RAM 230 is written with the time slot translation information transmitted to it over path 228-a, RAM 321 is written with the time slot and module ID information for a newly initiated call. The line designated 229 on FIG. 8 indicates the time slot segment in which the timing generator 503 applies a strobe signal to the line and trunk control 552 of network control 115. The lines designated 247 and 243 indicate the time slot segment in which a binary 1 is applied as a strobe signal to RAM 230 on path 247 and to RAM 321 on path 243.

I claim:

1. In a time division switching system having a plurality of call serving switching modules,
- a time division bus in each of said modules,
- a plurality of port circuits in each of said modules with each of said port circuits being connected to the time division bus of its module,
- means for assigning each call served by any one of said modules to a unique time slot in a series of cyclically recurring time slots,
- CHARACTERIZED IN THAT said system further comprises: a bus system interconnecting all of said modules for the exchange of call information between modules serving intermodule calls, means responsive to the serving of an intermodule call between port circuits in a first and a second one of said modules for exchanging call data words containing call message information over said bus system between said first and second modules, said data words further containing call control information including module identification (ID) information specifying one of said modules that is serving the intermodule call to which each word pertains, a buffer memory in each of said modules, means for writing into said buffer memory of any one of said modules said call message information of a data word received by a said one module over said bus system and pertaining to an intermodule call currently being served by said one module, said means for writing comprising control means in each of said modules responsive to the receipt of a data word for controlling said writing means to write said call message information of said data word into said buffer memory of only said specified module, means for repetitively scanning said buffer memory in each of said modules to read out any call message information stored in said buffer memory, and means effective upon each readout of call message information from any one of said buffer memories for applying said readout information over the time division bus of said module containing said readout memory to the module port circuit serving the call to which said readout information pertains.

2. The system of claim 1 in which said call control information in each data word further includes information specifying the time slot in which said specified module is to serve the call to which said word pertains, said writing means being effective for writing said time slot information of each word into said buffer memory concurrently with said message information of said word, means effective upon said readout of said call message information from said buffer memory of said specified module for concurrently reading out said time slot information, and means responsive to said readout of said time slot information for serving said call within said specified module in said specified time slot.

3. In a time division switching system having a plurality of call serving switching modules, a time division bus in each of said modules, a plurality of port circuits in each of said modules with each port circuit being connected to the time division bus of its module, means for assigning each call served by said system to a unique time slot in a series of cyclically recurring time slots within each module serving said call, CHARACTERIZED IN THAT said system further comprises: a bus system interconnecting all of said modules for the exchange of information between modules serving intermodule calls, means responsive to the serving of an intermodule call between port circuits in a first and a second one of said modules for transmitting call data words containing call message and control information over said bus system from said first module to all other of said modules as well as from said second module to all other of said modules, registering means and a buffer memory in each of said modules, means for entering into said registering means of a module each call data word received by said module, means for entering said call message and call control information of a registered data word into the buffer memory of a module only when said registered data word pertains to an intermodule call currently being served by said module, means for repetitively scanning said buffer memory in each of said modules to read out call message and control information currently stored in said buffer memory, and means responsive to each readout of said buffer memory of a module for applying the readout call message information over the time division bus of the module to the module port circuit serving said call to which said readout call message information pertains.

4. The system of claim 3 in which said means for transmitting comprises, means for converting call message information on said time division bus of a transmitting one of said modules into pulse code modulation (PCM) form, and generating means for forming a data word to be transmitted wherein said formed word includes said PCM message information as well as control information comprising module identification (ID) information specifying the other module that is serving the call to which said transmitted word pertains as well as information specifying the time slot in which said specified module is to serve said call.

5. The system of claim 4 in which said registering means and said means for entering comprises means in each module for receiving and registering each word transmitted over said bus system to said module, and means responsive to said registration of a received word within a module for entering the call message information and time slot information in said registered word into said buffer memory of said module only if the module ID information in said registered word specifies the ID of said module.

6. The system of claim 5 in which said means responsive to each readout includes a time slot driven random access memory (RAM) in each of said modules, means responsive to each readout of call message and time slot information from a buffer memory of a module for writing the readout call message information into said RAM of said module under control of said readout time slot information applied as address information to said RAM, means for subsequently reading out said call message information from said RAM under control of a time slot generating source, and means responsive to said readout of said RAM for applying said call message information readout of said RAM to the port circuit of said module serving the call to which said information pertains.

7. The system of claim 6 in which said means for applying comprises, a PCM to pulse amplitude modulation (PAM) decoder, means for applying said call message information readout of said RAM to said decoder for conversion from PCM to PAM form, means for applying said PAM message information from said decoder to the time division bus of said module, and means for extending said PAM information over said time division bus to the port circuit of said module serving the call to which said PAM information pertains.

8. In a time division switching system having a plurality of call serving switching modules,
a time division bus in each of said modules,
a plurality of port circuits in each of said modules with each of said port circuits being connected to the time division bus of its module,
means for assigning each call served by any one of said modules to a unique time slot in a series of cyclically recurring time slots,
CHARACTERIZED IN THAT said system further comprises: a bus system interconnecting all of said modules for the exchange of call information between modules serving intermodule calls,
means responsive to the serving of an intermodule call between port circuits in different ones of said modules for transmitting call data words containing call message information over said bus system between said modules,
said data words further containing call control information including module identification (ID) information specifying the one of said modules that is serving the intermodule call to which each word pertains as well as time slot information specifying the time slot in which said specified module is to serve the call to which said word pertains,
a buffer memory in each one of said modules for storing said call message information of a data word received over said bus system and pertaining to an intermodule call currently being served by said one module,
said buffer memory comprising control means in each of said modules responsive to the receipt of a data word containing module ID information specifying one of said modules for writing said call message information and said time slot information into said memory of only said specified module,
means for repetitively scanning said buffer memory in each of said modules to read out any call message information stored in said memory, and
means responsive to each readout of call message information from any one of said buffer memories for applying said readout information over the time division bus of said module containing said readout memory to the module port circuit serving the call to which said readout information pertains,
said means responsive to each readout comprising means effective concurrent with said readout of said call message information from said buffer memory of said specified module for reading out said time slot information, and means responsive to said readout of said time slot information for serving said call within said specified module in said specified time slot.

9. In a time division switching system having a plurality of call serving switching modules,
a time division bus in each of said modules,
a plurality of port circuits in each of said modules with each port circuit being connected to the time division bus of its module,
means for assigning each call served by said system to a unique time slot in a series of cyclically recurring time slots within each module serving said call,
CHARACTERIZED IN THAT said system further comprises: a bus system interconnecting all of said modules for the exchange of information between modules serving intermodule calls,
an output on each of said modules,
a plurality of inputs on each of said modules,
a plurality of conductors in said bus system with each conductor extending from an output of a different one of said modules to a different input on each one of said modules,
means responsive to the serving of an intermodule call between port circuits in a first and a second one of said modules for transmitting call data words containing call message and control information over said bus system from said first module over a first one of said bus conductors to all other of said modules as well as from said second module over a second one of said bus conductors to all other of said modules,
registering means and a buffer memory for each input of each of said modules,
means for entering into said registering means of a module each call data word received by said module on the input for said registering means,
means for entering said call message and call control information of a registered data word into a buffer memory of a module serving an intermodule call only when said registered data word pertains to an intermodule call currently being served by said module,
means for repetitively scanning said buffer memories in each of said modules to read out call message and control information currently stored in said memories, and
means responsive to each readout of said buffer memories of a module for applying the readout call message information over the time division bus of the module to the module port circuit serving said call to which said readout call message information pertains.

10. The system of claim 9 in which said means for transmitting comprises,
means for converting call message information on said time division bus of a transmitting one of said modules into pulse code modulation (PCM) form,
generating means for forming a data word to be transmitted with said formed word including said PCM message information as well as control information comprising module identification (ID) information specifying the other module that is serving the call to which said transmitted word pertains as well as information specifying the time slot in which said specified module is to serve said call, and
means for applying each formed word to the output of said transmitting module for transmission over a unique bus conductor to an input on every other one of said modules.

11. The system of claim 10 in which said registering means comprises means in each one of said modules for receiving and registering each word transmitted over said bus system to each of said modules, and
means in each module responsive to said registration of a received word for applying the call message information and time slot information in said registered word to a buffer memory of said module only if the module ID information in said registered word specifies the ID of said module.

12. The system of claim 11 in which said means responsive to each readout includes a time slot driven random access memory (RAM), means responsive to the readout of call message and time slot information from a buffer memory of a module for writing the readout call message information into said RAM of said module under control of said readout time slot information applied as address information to said RAM, means for subsequently reading out said call message information from said RAM under control of a time slot generating source, a PCM to pulse amplitude modulation (PAM) decoder, means for applying said call message information readout of said RAM to said decoder for conversion from PCM to PAM form, means for applying said PAM information from said decoder to the time division bus of said module, and means for extending said PAM information over said time division bus to the port circuit of said module serving the call to which said PAM information pertains.

13. The method of serving calls between port circuits in different modules of a time division switching system in which each module has a plurality of port circuits connected to a time division bus, a bus system interconnecting all of said modules for the serving of intermodule calls, said method comprising the steps of:
(1) exchanging call data words containing call message information over said bus system between a first and a second one of said modules serving an intermodule call,
(2) temporarily registering in a module each word received by said module over said bus system,
(3) entering said message information of a registered word into a buffer memory of a module only when said registered word pertains to an intermodule call currently being served by said module,
(4) repetitively scanning said buffer memory of each module to read out any call message information stored in said buffer memory, and
(5) applying said readout call message information to the time division bus of the module containing said readout memory.

14. The method of claim 13 wherein each data word further contains call control information comprising module identification (ID) information specifying one of said modules that is to serve the call to which each word pertains as well as time slot information specifying the time slot in which said specified module is to serve said call, said method further comprising the steps of:
(1) writing said time slot information of each word registered by said specified module into the buffer memory of said specified module,
(2) reading out said time slot information in said buffer memory concurrently with said readout of said call message information, and
(3) extending said call message information to the port circuit serving said call in said specified module under control of said readout time slot information.

15. The method of serving intermodule calls in a time division switching system having a plurality of call serving switching modules with each module having a plurality of port circuits connected to a time division bus, a bus system interconnecting all of said modules for the serving of intermodule calls, said method comprising the steps of:
(1) transmitting call data words containing call message information in pulse code modulation (PCM) form and call control information including time slot information over said bus system between a first and a second one of said modules serving an intermodule call,
(2) temporarily registering in a module each word received by said module over said bus system,
(3) entering said call message and time slot information of a registered word into a buffer memory of a module only when the registered word in said module pertains to an intermodule call currently being served by said module,
(4) repetitively scanning said buffer memory of each module to readout out any call message and time slot information stored in said buffer memory; and
(5) applying said readout call message information to the time division bus of the module containing said readout memory under control of said readout time slot information.

16. The method of claim 15 in which said step of applying comprises the steps of:
(1) writing said readout call message information into a time slot driven RAM in said module with said readout time slot information being applied as address information to said RAM for said write operation,
(2) reading out said call message information from said RAM under control of a time slot signal source,
(3) converting said readout call message information of said RAM from pulse code modulation (PCM) to pulse amplitude modulation (PAM) form, and
(4) applying said PAM information to said port circuit serving said call over the time division bus of said specified module.

17. The method of serving intermodule calls in a time division switching system having a plurality of call serving switching modules with each module having a plurality of port circuits connected to a time division bus, a bus system interconnecting all of said modules for the serving of intermodule calls, said method comprising the steps of:
(1) transmitting data words containing call message and call control information including time slot information over said bus system from a first one of said modules serving a call to all other ones of said modules as well as from a second one of said modules serving said call to all other ones of said modules,
(2) temporarily registering in a module each word received by said module over said bus system,
(3) entering said message and time slot information of a registered word into a buffer memory of a module only when said registered word pertains to an intermodule call currently being served by said module,
(4) repetitively scanning said buffer memory of each module to read out any call message and time slot information stored in said buffer memory of said module,
(5) writing said readout call message information into a time slot driven memory (RAM) in said module under control of said readout time slot information applied as address information to the address input of said RAM for said write operation, (6) reading call message information out of said RAM under control of a source of time slot signals, and (7) applying said call message information readout of said RAM to the port circuit serving said call in said module over the time division bus of said module.

* * * * *